(12) United States Patent
Iwahori et al.

(10) Patent No.: US 12,725,419 B2
(45) Date of Patent: Sep. 1, 2026

(54) DETECTING APPARATUS, POSITION CALCULATION SYSTEM, AND DETECTING METHOD

(71) Applicant: TOYOTA JIDOSHA KABUSHIKI KAISHA, Toyota (JP)

(72) Inventors: Kento Iwahori, Nagoya (JP); Daiki Yokoyama, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 253 days.

(21) Appl. No.: 18/623,560

(22) Filed: Apr. 1, 2024

(65) Prior Publication Data

US 2024/0420473 A1 Dec. 19, 2024

(30) Foreign Application Priority Data

Jun. 19, 2023 (JP) ................................ 2023-099795

(51) Int. Cl.
*G06V 10/00* (2022.01)
*G06T 5/80* (2024.01)
(Continued)

(52) U.S. Cl.
CPC ................ *G06V 20/52* (2022.01); *G06T 5/80* (2024.01); *G06T 7/73* (2017.01); *G06V 10/22* (2022.01);
(Continued)

(58) Field of Classification Search
CPC ...... G06V 10/25; G06V 10/85; G06V 10/761; G06V 10/762; G06V 10/764;
(Continued)

(56) References Cited

U.S. PATENT DOCUMENTS 10,552,686 B2 * 2/2020 Yasunaga ............. G06V 10/147
10,713,507 B2 * 7/2020 Noda ..................... G08G 1/166
(Continued)

FOREIGN PATENT DOCUMENTS

JP 2017-538619 A 12/2017

OTHER PUBLICATIONS

Yang, (CN 106248394 A an On-line Detecting Device for Automobile Air Outlet and Detecting Method Thereof), date published Dec. 21, 2016.*

(Continued)

*Primary Examiner* — Amir Alavi
(74) *Attorney, Agent, or Firm* — Sughrue Mion, PLLC

(57) ABSTRACT

In a detecting apparatus configured to detect a vehicle in a captured image, the vehicle is configured to move in a factory in which manufacturing steps are performed to manufacture and ship the vehicle, the vehicle is classified into states in accordance with an appearance of the vehicle, varying among the manufacturing steps. The detecting apparatus includes a first processor configured to acquire the captured image, acquire state information indicating one of the states of the vehicle in the captured image, from among first detection models that are machine learning models each prepared one by one for the states, acquire the first detection model selected in accordance with the one of the states, identified by the acquired state information, and detect the vehicle in the captured image by inputting the captured image to the acquired first detection model and identifying a target region representing the vehicle in the captured image.

11 Claims, 18 Drawing Sheets

(51) Int. Cl.

| | |
|---|---|
| ***G06T 7/73*** | (2017.01) |
| ***G06V 10/22*** | (2022.01) |
| ***G06V 10/24*** | (2022.01) |
| ***G06V 10/764*** | (2022.01) |
| ***G06V 10/774*** | (2022.01) |
| ***G06V 20/52*** | (2022.01) |
| ***G06V 20/70*** | (2022.01) |

(52) U.S. Cl.

CPC .......... *G06V 10/242* (2022.01); *G06V 10/764* (2022.01); *G06V 10/774* (2022.01); *G06V 20/70* (2022.01); *G06T 2207/20081* (2013.01); *G06T 2207/30108* (2013.01); *G06T 2207/30248* (2013.01); *G06V 2201/08* (2022.01)

(58) Field of Classification Search

CPC .. G06V 10/765; G06V 10/7715; G06V 20/52; G06V 20/70; G06V 20/60; G06V 2201/06; G06V 2201/08; G06V 10/82; G06N 20/00; G06N 20/10; G06N 20/20; G05D 1/43; G05D 1/242; G05D 1/65; G05D 1/644; G05D 1/243; G05D 2105/20; G06T 7/73; G06T 5/80; G06T 2207/20081; G06T 2207/20084; G06T 2207/30248; G06T 2207/30108

See application file for complete search history.

(56) References Cited

U.S. PATENT DOCUMENTS

| | | | | |
|---|---|---|---|---|
| 10,860,870 | B2 * | 12/2020 | Noda | G08G 1/165 |
| 10,956,782 | B2 * | 3/2021 | Sivalingam | G06V 10/774 |
| 11,132,560 | B2 * | 9/2021 | Friedmann | G06V 20/58 |
| 11,189,048 | B2 * | 11/2021 | Nishimura | G06T 7/70 |
| 11,680,801 | B2 * | 6/2023 | Benou | G01C 21/00<br>701/301 |
| 12,283,110 | B2 * | 4/2025 | Itsumi | G06V 20/58 |
| 12,354,368 | B2 * | 7/2025 | Yang | G06T 7/70 |
| 2017/0320529 | A1 | 11/2017 | Nordbruch | |
| 2020/0368861 | A1 | 11/2020 | Artigas et al. | |
| 2022/0129675 | A1 | 4/2022 | Takimoto et al. | |
| 2024/0420473 | A1 * | 12/2024 | Iwahori | G06V 10/25 |

OTHER PUBLICATIONS

Bauer et al. (WO 2021043419 A1 Method and Device for Operating an Automation System), date published Mar. 11, 2021.*

Wei et al. (CN 102534461 AProcess for Remanufacturing Engine Crankshaft by Automatic High-speedElectric Arc Spraying), date published Jul. 4, 2012.*

* cited by examiner 1
5
DETECTING APPARATUS
6
POSITION CALCULATION APPARATUS
7
REMOTE CONTROLLER
Nt
9,901
9,902
RG,RG1
RG,RG2
10,101
10,102
10e
110, 120, 130
110,120,130
140
150
160
170
180
2

10,101
170
140
150
160
110,
120,
130
170
PLATFORM MANUFACTURING STEP
180
180
10,102
110,120,130
160
140
150
170
170
BODY SHELL ASSEMBLING STEP
190
180
190
10,103
110,120,130
170
170
140 150
160
PARTS ASSEMBLING STEP

5
DETECTING APPARATUS
53
STORAGE UNIT
FIRST DETECTION MODEL
Md1b
Md1a
Md1
STEP DATABASE
Db1
DISTORTION CORRECTION PARAMETER
Pa1
51
COMMUNICATION UNIT
52
CPU

6
POSITION CALCULATION APPARATUS
62
CPU
DATA ACQUISITION UNIT
621
PERSPECTIVE TRANSFORMATION UNIT
622
COORDINATE POINT CALCULATION UNIT
623
POSITION TRANSFORMATION UNIT
624
SECOND SENDING UNIT
625
61
COMMUNICATION UNIT
63
STORAGE UNIT
PERSPECTIVE TRANSFORMATION PARAMETER
Pa2
CAMERA DATABASE
Db2

Im1
Im2
Im3
Im4
Im5
Im6
A1
A2
10
20
21
Ms
Xc
Yc
Xi
Yi
STEP S1
STEP S2
STEP S3
STEP S4
STEP S7
STEP S8

FIG. 9

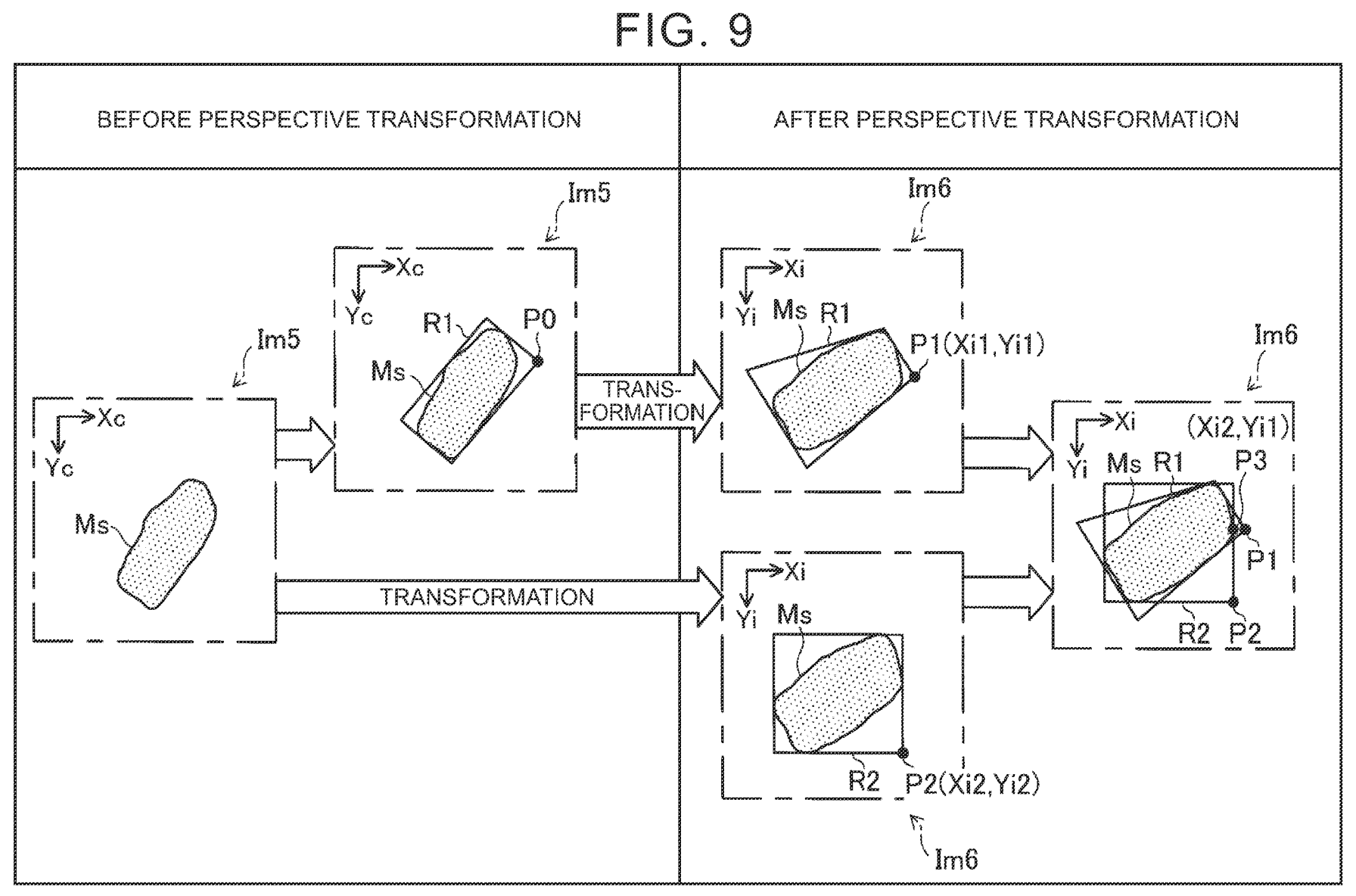

BEFORE PERSPECTIVE TRANSFORMATION

AFTER PERSPECTIVE TRANSFORMATION

Im5
Xc
Yc
Ms

Im5
Xc
Yc
P0
R1
Ms

TRANS-
FORMATION

TRANSFORMATION

Im6
Xi
Yi
Ms
R1
P1(Xi1,Yi1)

Im6
Xi
Yi
Ms
R2
P2(Xi2,Yi2)

Im6
(Xi2, Yi1)
P3
P1
P2
Xi
Yi
Ms
R1
R2

9
Pc
H
Pf
D
Do
h
Pv
ΔD
10e
P3
10
20
Xg 10,101
140
170
150
110,
120,
130
170
160
PLATFORM MANUFACTURING STEP
180
180
10,102,104
110,120,130
140
150
170
170
160
BODY SHELL ASSEMBLING STEP
190
180
190
10,103,104
110,120,130
170
170
140 150
160
PARTS ASSEMBLING STEP
180
190
10,103,105
110,120,130
170
170
140 150
160
PAINTING STEP

5c
DETECTING APPARATUS
53c
STORAGE UNIT
FIRST DETECTION MODEL
Md1b
Md1a
Md1
SPECIFIC MODEL
Md3
DISTORTION CORRECTION PARAMETER
Pa1
51
COMMUNICATION UNIT
52c
CPU

5d
DETECTING APPARATUS
53d
STORAGE UNIT
FIRST DETECTION MODEL
Md1b
Md1a
Md1
STEP DATABASE
Db3
DISTORTION CORRECTION PARAMETER
Pa1
51
COMMUNICATION UNIT
52d
CPU

DETECTING APPARATUS, POSITION CALCULATION SYSTEM, AND DETECTING METHOD

CROSS-REFERENCE TO RELATED APPLICATION

This application claims priority to Japanese Patent Application No. 2023-099795 filed on Jun. 19, 2023, incorporated herein by reference in its entirety.

BACKGROUND

1. Technical Field

The disclosure relates to a detecting apparatus, a position calculation system, and a detecting method.

2. Description of Related Art

There is known a vehicle that automatically moves by remote control (Japanese Unexamined Patent Application Publication (Translation of PCT Application) No. 2017-538619 (JP 2017-538619 A)).

SUMMARY

To cause a vehicle to automatically move by remote control, an image of the vehicle may be captured from outside. However, when vehicles are moving in a factory for manufacturing vehicles, there can be various appearances of vehicles according to manufacturing steps. For example, the appearance of a vehicle in a form of platform in which various devices such as wheels and a vehicle controller are assembled to a chassis and the appearance of a vehicle in which a vehicle body such as a body shell is assembled to a chassis significantly differ from each other. The inventors of the subject application found that there was a possibility of decrease in the accuracy of detecting a vehicle contained in a captured image due to such a difference in the appearance of a vehicle according to a manufacturing step.

The disclosure may be implemented as the following aspects.

A first aspect of the disclosure provides a detecting apparatus. In the detecting apparatus configured to detect a vehicle contained in a captured image, the vehicle is configured to move in a factory in which a plurality of manufacturing steps is performed to manufacture and ship the vehicle, and the vehicle is classified into a plurality of states in accordance with an appearance of the vehicle, varying among the plurality of manufacturing steps. The detecting apparatus includes a first processor. The first processor is configured to acquire the captured image, acquire state information indicating one of the states of the vehicle contained in the captured image, from among a plurality of first detection models that are machine learning models each prepared one by one for the states, acquire the first detection model selected in accordance with the one of the states, identified by the acquired state information, and detect the vehicle contained in the captured image by inputting the captured image to the acquired first detection model and identifying a target region representing the vehicle in the captured image. According to this aspect, it is possible to acquire state information indicating the state of the vehicle contained in a captured image and, from among a plurality of first detection models each prepared one by one for the states, acquire the first detection model selected in accordance with one of the states, identified by the acquired state information. Then, it is possible to accurately detect the vehicle contained in the captured image by inputting the captured image to the first detection model according to the state of the vehicle contained in the captured image. In other words, when the first detection model appropriate for detection of the vehicle that is classified to one of the states is used, it is possible to accurately classify regions that make up the captured image into a target region and a region other than the target region. Thus, it is possible to suppress a decrease in the accuracy of detecting the vehicle contained in the captured image in accordance with a difference in appearance among the plurality of manufacturing steps.

In the first aspect, each of the plurality of first detection models may be trained in advance to identify the target region by inputting a plurality of training images, and the plurality of training images may include M (M is an integer greater than or equal to two) first training images each containing the vehicle that is classified to the one of the states and N (N is an integer greater than or equal to zero and less than M) second training images each containing the vehicle that is classified to another one of the states, different from the one of the states. According to this configuration, the number of the first training images each containing the vehicle that is classified to one of the states and subjected to training is made greater than the number of the second training images each containing the vehicle that is classified to another state different from the one of the states. As a result, it is possible to prepare the first detection model appropriate for the vehicle that is classified to the one of the states one by one for the states.

In the above configurations, a region correct label may be associated with each region in the training image, and the region correct label may indicate which one of the target region and an off-target region representing an object other than the vehicle. According to this configuration, it is possible to accurately classify regions that make up a captured image into a target region and an off-target region. Thus, it is possible to improve the accuracy of detecting the vehicle contained in the captured image.

In the above aspects, the first processor may be configured to acquire the state information by acquiring step information on one of the manufacturing steps, being performed on the vehicle, and identifying the state information associated with the one of the manufacturing steps, identified by the acquired step information by using a step database in which the state information is associated with each of the plurality of manufacturing steps. According to this configuration, it is possible to acquire step information on one of the manufacturing steps, being performed on the vehicle. Then, when the state information associated with one of the manufacturing steps, identified by the acquired step information, is identified by using the step database, it is possible to acquire state information indicating the state of the vehicle contained in the captured image.

In the above aspects, the first processor may be configured to, when the captured image is input, acquire the state information by inputting the captured image to a specific model that is a machine learning model trained so as to output the state information. According to this configuration, when a captured image is input to a specific model trained so as to output state information on the vehicle contained in the captured image, it is possible to acquire state information indicating the state of the vehicle contained in the captured image.

In the above aspects, the first processor may be configured to acquire the state information by acquiring image capture information on image capture devices and identifying the state information associated with one of the image capture devices, identified by the acquired image capture information, by using a state database in which the image capture information is associated with the state information. According to this configuration, it is possible to acquire image capture information on the image capture device. Then, when state information associated with one of the image capture devices, identified by the acquired image capture information, is identified by using a state database in which image capture information is associated with state information, it is possible to acquire state information indicating the state of the vehicle contained in the captured image.

In the above aspects, the plurality of manufacturing steps may include painting the vehicle, and the plurality of states may include an unpainted state and a painted state. The unpainted state may indicate the state of the vehicle before being painted in painting the vehicle. The painted state may indicate the state of the vehicle after being painted in painting in painting the vehicle. According to this configuration, it is possible to classify the state of the vehicle into an unpainted state and a painted state based on whether before being painted and after being painting is performed in the painting step. Thus, it is possible to suppress a decrease in the accuracy of detecting the vehicle contained in the captured image in accordance with a difference in appearance color of the vehicle before and after the painting step is performed.

In the above aspects, the first processor may be configured to correct a distortion of the captured image. According to this configuration, it is possible to correct a distortion of the captured image. Thus, it is possible to improve the accuracy of detecting the vehicle contained in the captured image.

In the above aspects, the first processor may be configured to rotate the captured image such that a moving direction of the vehicle is oriented in a predetermined direction. According to this configuration, it is possible to rotate the captured image such that a direction of a vector indicating the moving direction of the vehicle is oriented in a predetermined direction. As a result, it is possible to detect the vehicle contained in the captured image in a state where the direction of a vector indicating the moving direction of the vehicle is unified. Thus, it is possible to improve the accuracy of detecting the vehicle contained in the captured image.

A second aspect of the disclosure provides a detecting apparatus. In the detecting apparatus configured to detect a vehicle contained in a captured image, the vehicle is configured to move in a factory in which a plurality of manufacturing steps is performed to manufacture and ship the vehicle, the vehicle is classified into a plurality of states in accordance with an appearance of the vehicle, varying among the plurality of manufacturing steps, and the plurality of states includes a platform state. The platform state is a form of platform in which the vehicle includes at least a wheel, a chassis, a drive unit configured to accelerate the vehicle, a steering device configured to change a traveling direction of the vehicle, a braking device configured to decelerate the vehicle, a vehicle controller configured to control an operation of the vehicle, and a vehicle communication unit configured to communicate with another apparatus other than the host vehicle. The detecting apparatus includes a first processor. The first processor is configured to acquire the captured image, acquire state information indicating one of the states of the vehicle contained in the captured image, from among a plurality of first detection models that are machine learning models each prepared one by one for the states, acquire the first detection model selected in accordance with the one of the states, identified by the acquired state information, and detect the vehicle contained in the captured image by inputting the captured image to the acquired first detection model and identifying a target region representing the vehicle in the captured image. According to this aspect, when the form of the vehicle is a form of platform, it is possible to classify the state of the vehicle to a platform state. Then, when the vehicle that is classified to the platform state is detected, it is possible to detect the vehicle by using the first detection model appropriate for detection of the vehicle that is classified to the platform state. When the vehicle that is classified to the platform state is detected, it is possible to detect the vehicle by inputting a captured image associated with the platform state to a second detection model. Thus, it is possible to improve the accuracy of detecting the vehicle that is classified to the platform state.

In the second aspect, each of the plurality of first detection models may be trained in advance to identify the target region by inputting a plurality of training images, and the plurality of training images may include M (M is an integer greater than or equal to two) first training images each containing the vehicle that is classified to the one of the states and N (N is an integer greater than or equal to zero and less than M) second training images each containing the vehicle that is classified to another one of the states, different from the one of the states. According to this configuration, the number of the first training images each containing the vehicle that is classified to one of the states and subjected to training is made greater than the number of the second training images each containing the vehicle that is classified to another state different from the one of the states. As a result, it is possible to prepare the first detection model appropriate for the vehicle that is classified to the one of the states one by one for the states.

A third aspect of the disclosure provides a detecting apparatus. In a detecting apparatus configured to detect a vehicle contained in a captured image, the vehicle is configured to move in a factory in which a plurality of manufacturing steps is performed to manufacture and ship the vehicle, and the vehicle is classified into a plurality of states in accordance with an appearance of the vehicle, varying among the plurality of manufacturing steps. The detecting apparatus includes a first processor. The first processor is configured to acquire the captured image, acquire state information indicating one of the states of the vehicle contained in the captured image, and detect the vehicle contained in the captured image by inputting the captured image and the one of the states, identified by the acquired state information, to a second detection model that is a machine learning model and identifying a target region representing the vehicle in the captured image. According to this aspect, it is possible to accurately detect the vehicle contained in the captured image associated with the state of the vehicle by inputting the captured image to the second detection model. In other words, it is possible to accurately classify regions that make up the captured image into a target region and a region other than the target region. Thus, it is possible to suppress a decrease in the accuracy of detecting the vehicle contained in the captured image in accordance with a difference in appearance among the plurality of manufacturing steps.

In the above third aspect, the second detection model may be trained in advance to identify the target region by inputting a plurality of training images each containing the vehicle and a state correct label. The state correct label may be associated with each of the plurality of training images and indicates the state of the vehicle contained in the training image. According to this configuration, it is possible to prepare the second detection model subjected to training while a plurality of training images each containing the vehicle and a state correct label indicating the state of the vehicle contained in the training image.

A fourth aspect of the disclosure provides a position calculation system. The position calculation system configured to calculate a position of a vehicle contained in a captured image includes the detecting apparatus according to the above aspects. The first processor is further configured to generate a first mask image, in which a mask region is added to a target region that is a region representing the vehicle, by masking the target region in the captured image. The position calculation system further includes a position calculation apparatus configured to calculate a position of the vehicle. The position calculation apparatus includes a second processor. The second processor is configured to generate a second mask image by performing perspective transformation of the first mask image, where a designated vertex of a first circumscribed rectangle set for the mask region in the first mask image is a first coordinate point and a vertex indicating the same position as the first coordinate point of a second circumscribed rectangle set for the mask region in the second mask image is a second coordinate point, calculate an image coordinate point indicating a position of the vehicle in an image coordinate system by correcting the first coordinate point using the second coordinate point, and convert the image coordinate point to a vehicle coordinate point indicating a position of the vehicle in a global coordinate system by using a distance from a reference point of the image capture device, calculated based on a position of the image capture device in the global coordinate system, and a distance from the reference point of a predetermined measuring point of the vehicle. According to this aspect, it is possible to calculate a position of the vehicle contained in the captured image. It is possible to generate a first mask image in which a target region representing the vehicle, of regions that make up the captured image, is masked and a second mask image obtained by performing perspective transformation of the first mask image. As a result, it is possible to calculate an image coordinate point by calculating a first coordinate point from the first mask image and calculate a second coordinate point from the second mask image. Thus, it is possible to further accurately calculate an image coordinate point. Therefore, it is possible to improve the accuracy of calculating a position of the vehicle.

A fifth aspect of the disclosure provides a detecting method. In a detecting method of detecting a vehicle contained in a captured image, the vehicle is configured to move in a factory in which a plurality of manufacturing steps is performed to manufacture and ship the vehicle, and the vehicle is classified into a plurality of states in accordance with an appearance of the vehicle, varying among the plurality of manufacturing steps. The detecting method includes acquiring the captured image, acquiring state information indicating one of the states of the vehicle contained in the captured image, from among a plurality of first detection models that are machine learning models each prepared one by one for the states, acquiring the first detection model selected in accordance with the one of the states, identified by the acquired state information, and detecting the vehicle contained in the captured image by inputting the captured image to the acquired first detection model and identifying a target region representing the vehicle in the captured image. According to this aspect, it is possible to acquire state information indicating the state of the vehicle contained in a captured image and, from among a plurality of first detection models each prepared one by one for the states, acquire the first detection model selected in accordance with one of the states, identified by the acquired state information. Then, it is possible to accurately detect the vehicle contained in the captured image by inputting the captured image to the first detection model according to the state of the vehicle contained in the captured image. In other words, when the first detection model appropriate for detection of the vehicle that is classified to one of the states is used, it is possible to accurately classify regions that make up the captured image into a target region and a region other than the target region. Thus, it is possible to suppress a decrease in the accuracy of detecting the vehicle contained in the captured image in accordance with a difference in appearance among the plurality of manufacturing steps.

A sixth aspect of the disclosure provides a detecting method. In a detecting method of detecting a vehicle contained in a captured image, the vehicle is configured to move in a factory in which a plurality of manufacturing steps is performed to manufacture and ship the vehicle, and the vehicle is classified into a plurality of states in accordance with an appearance of the vehicle, varying among the plurality of manufacturing steps. The detecting method includes acquiring the captured image, acquiring state information indicating one of the states of the vehicle contained in the captured image, and detecting the vehicle contained in the captured image by inputting the captured image and the one of the states, identified by the acquired state information, to a second detection model that is a machine learning model and identifying a target region representing the vehicle in the captured image. According to this aspect, it is possible to accurately detect the vehicle contained in the captured image associated with the state of the vehicle by inputting the captured image to the second detection model. In other words, it is possible to accurately classify regions that make up the captured image into a target region and a region other than the target region. Thus, it is possible to suppress a decrease in the accuracy of detecting the vehicle contained in the captured image in accordance with a difference in appearance among the plurality of manufacturing steps.

The disclosure may be implemented in various modes other than the above-described detecting apparatus, position calculation system, or detecting method. The disclosure may be implemented by, for example, a manufacturing method for a detecting apparatus and a position calculation system, a position calculation method, a control method for a detecting apparatus and a position calculation system, and a non-transitory recording medium on which a computer program that implements the control method is recorded, and the like.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 9 is a view for illustrating the details of a coordinate point calculation step;

DETAILED DESCRIPTION OF EMBODIMENTS

A. First Embodiment

A-1. Configuration of Position Calculation System

Figure 1:
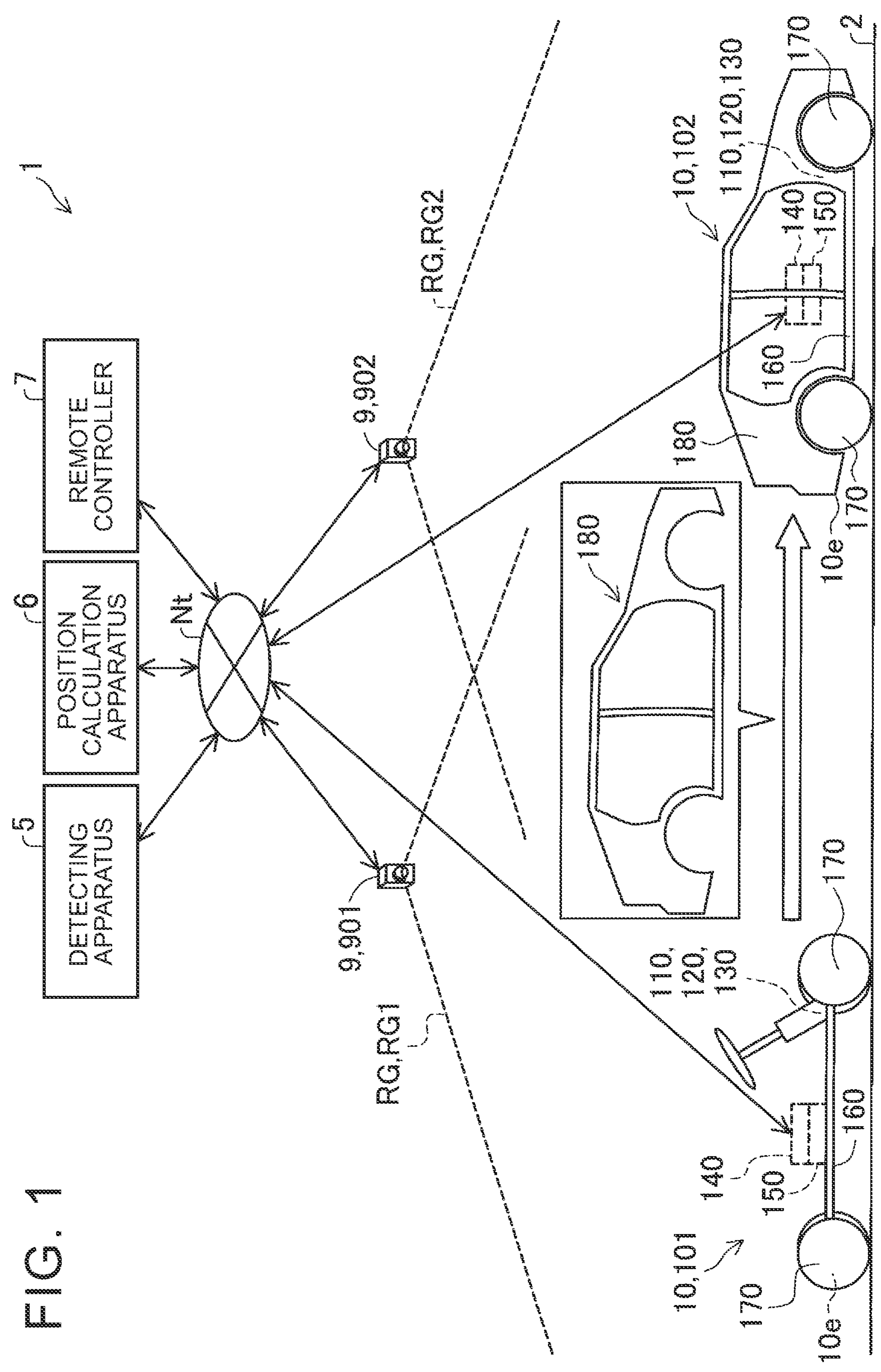
FIG. 1 is a diagram that shows the configuration of a position calculation system.

FIG. 1 is a diagram that shows the configuration of a position calculation system 1. The position calculation system 1 detects a vehicle 10 contained in a captured image and calculates the position of the vehicle 10. In an embodiment of the disclosure, a captured image is at least any one of a raw image serving as raw data acquired by an image capture device 9 serving as an external apparatus provided in a place different from a place where the vehicle 10 is, and a corrected image, a rotated image, and a processed image, obtained by processing a raw image. The details of a corrected image, a rotated image, and a processed image will be described later. The position calculation system 1 includes one or more vehicles 10, a detecting apparatus 5 that detects a vehicle 10 contained in a captured image, and a position calculation apparatus 6 that calculates the position of a vehicle 10 by using a result detected by the detecting apparatus 5.

The image capture device 9 acquires a raw image by capturing an image of an image capturing range RG, containing a vehicle 10 that is a target for position calculation, from outside the vehicle 10. In the present embodiment, the image capture device 9 sends an acquired raw image to the detecting apparatus 5 together with camera identification information and acquisition time of the raw image. Camera identification information is a unique identifier (ID) assigned so as to avoid duplication between the plurality of image capture devices 9 in order to identify the image capture devices 9. A raw image is a two-dimensional image made up of gathered pixels disposed in an Xc-Yc plane in a camera coordinate system. A camera coordinate system is a coordinate system having an origin set at the focal point of the image capture device 9 and having coordinate axes represented by an Xc-axis and a Yc-axis orthogonal to the Xc-axis. A raw image contains at least two-dimensional data of a vehicle 10 that is a target for position calculation. A raw image is preferably a color image and may also be a gray image. The image capture device 9 is a camera including an optical system and an imaging device, such as a CCD image sensor and a CMOS image sensor.

In the present embodiment, the image capture device 9 acquires a raw image looking down upon a course 2 and a vehicle 10 moving along the course 2 from above. To capture the image of the entire course 2 with the one or more image capture devices 9, the installation position of each image capture device 9 and the number of image capture devices 9 are determined in consideration of the image capturing range RG (angle of view) of each image capture device 9. Specifically, the image capture devices 9 are installed such that a first image capturing range RG1 and a second image capturing range RG2 adjacent to each other overlap. The first image capturing range RG1 is the image capturing range RG of a first image capture device 901. The second image capturing range RG2 is the image capturing range RG of a second image capture device 902. Furthermore, each image capture device 9 is installed at a position where the image of a measuring point 10e set in advance for a specific part of the vehicle 10 moving along the course 2 can be captured. In the present embodiment, the measuring point 10e is a rear end at the left side (left rear end) of the vehicle 10. The measuring point 10e may be other than the left rear end of the vehicle 10. The image capture device 9 may acquire not only information from above the vehicle 10 but also information, such as the front, rear, and side of the vehicle 10.

Examples of the vehicle 10 include a battery electric vehicle, a hybrid electric vehicle, a fuel cell electric vehicle, a gasoline vehicle, and a diesel vehicle. The vehicle 10 may be a private automobile, such as a passenger vehicle, or may be a commercial automobile, such as a truck, a bus, and a construction vehicle.

The vehicle 10 has a manned driving mode and a remote unmanned driving mode. In the manned driving mode, when a driver in the vehicle 10 operates an input device, such as a steering wheel and an accelerator of the vehicle 10, a driving condition of the vehicle 10 is generated. Thus, the vehicle 10 moves in accordance with the generated driving condition. The driving condition defines the driving operation of the vehicle 10. The driving condition includes, for example, a travel route, position, travel speed, and acceleration of the vehicle 10 and a steering angle of wheels 170. The remote unmanned driving mode includes a remote manual driving mode and a remote automated driving mode. In the remote manual driving mode, when an operator operates an operator input device provided in a place different from a place where the vehicle 10 is, the driving condition of the vehicle 10 is generated. Thus, the vehicle 10 receives the driving condition generated by the operator input device and moves in accordance with the received driving condition. In the remote automated driving mode, the remote controller 7, such as a server, provided in a place different from a place where the vehicle 10 is, creates a control value that defines the driving operation of the vehicle 10 and sends the control value to the vehicle 10. Thus, the vehicle 10 receives the control value and performs automated driving according to the received control value.

In the present embodiment, the vehicle 10 moves in the remote automated driving mode in a factory where a plurality of manufacturing steps is performed to manufacture and ship the vehicle 10. The factory is not limited to a case of being present in a building, a case of being present at a site or address, or the like and may be present over a plurality of buildings, a plurality of sites, a plurality of addresses, or the like. The factory may include a storage location, such as a yard, that stores the vehicle 10 as a finished product manufactured by performing a plurality of manufacturing steps before shipment. At this time, the vehicle 10 may move not only on a private road but also on a public road.

Figure 2:
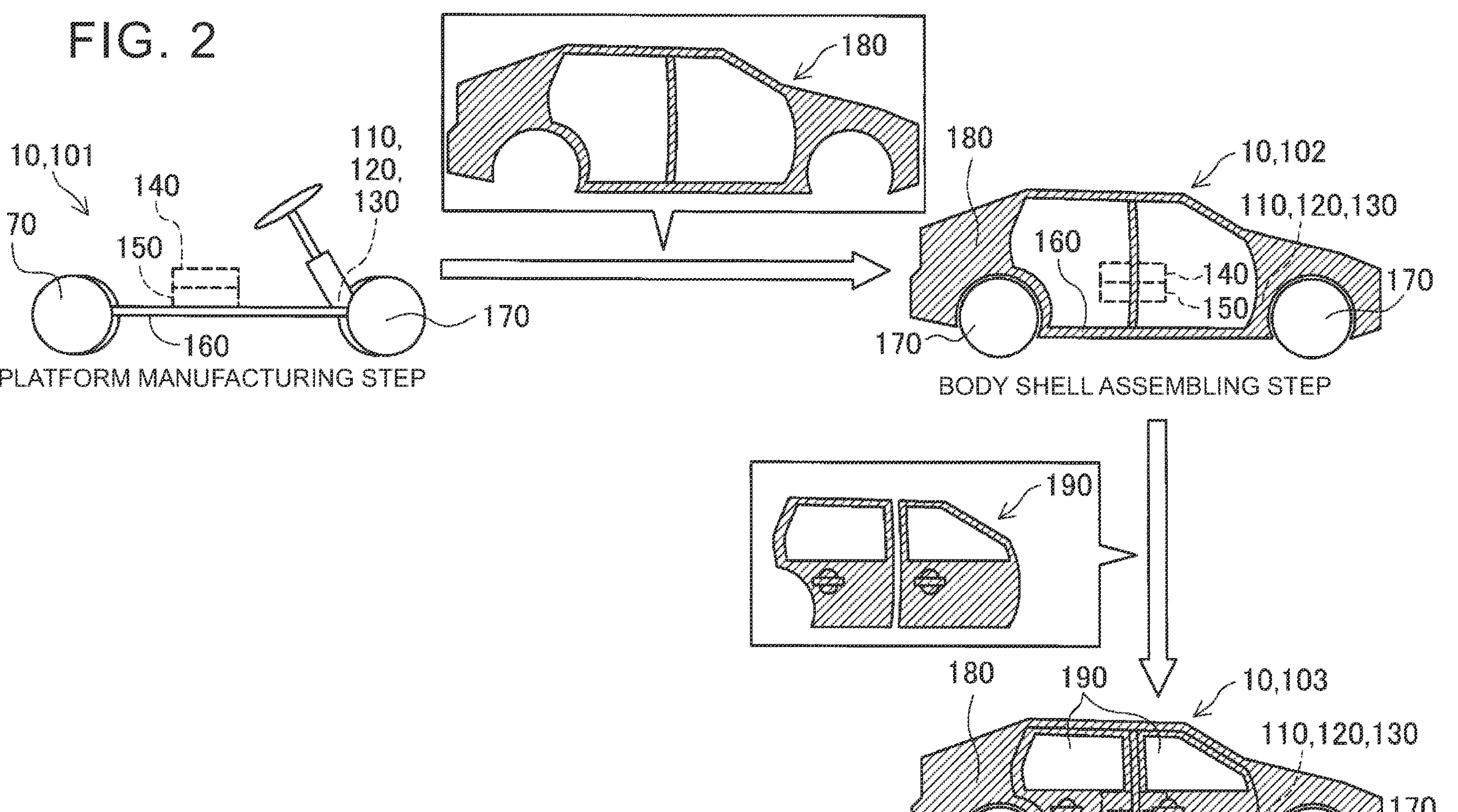
FIG. 2 is a diagram that shows a manufacturing process of a vehicle according to a first embodiment.

FIG. 2 is a diagram that shows a manufacturing process of the vehicle 10 according to the first embodiment. In FIG. 2, some of the plurality of manufacturing steps that are performed in the manufacturing process of the vehicle 10 are representatively shown. In the example shown in FIG. 2, the vehicle 10 serving as a finished product is manufactured by assembling a painted body shell 180 to a vehicle 101 in a form of platform (hereinafter, a platform vehicle 101) and then assembling interior parts, such as seats, and exterior parts 190, such as door panels, to the platform vehicle 101.

A platform manufacturing step is a manufacturing step of manufacturing the platform vehicle 101. The platform vehicle 101 is a vehicle 10 capable of achieving at least three functions, that is, "moving", "turning", and "stopping", through remote control by the remote controller 7. Specifically, the platform vehicle 101, for example, includes at least a drive unit 110, a steering device 120, a braking device 130, a vehicle communication unit 140, a vehicle controller 150, a chassis 160, and the wheels 170. The drive unit 110 accelerates the vehicle 10. The drive unit 110 includes at least a driving force source and a power supply device that supplies power to the driving force source. When the vehicle 10 is a battery electric vehicle, the driving force source is a motor, and the power supply device is a battery, such as a lithium ion battery. The steering device 120 changes the traveling direction of the vehicle 10. The braking device 130 decelerates the vehicle 10. The vehicle communication unit 140 communicates with external devices by using wireless communication or the like. The external devices are devices other than the host vehicle and other vehicles 10. The devices other than the host vehicle are the detecting apparatus 5, the position calculation apparatus 6, the remote controller 7, the image capture device 9, and the like. The vehicle communication unit 140 is, for example, a wireless communication device. The vehicle communication unit 140, for example, communicates via an access point in a factory with the external devices connected to a network Nt. The vehicle controller 150 includes a CPU, a storage unit, and an input/output interface. In the vehicle controller 150, the CPU, the storage unit, and the input/output interface are connected to one another via, for example, an internal bus and an interface circuit. The input/output interface communicates with an internal device of the drive unit 110 or the like mounted on the host vehicle 10. The input/output interface is connected to the vehicle communication unit 140 such that communication is possible. The chassis 160 is a chassis part that supports various devices 110, 120, 130, 140, 150 mounted on the vehicle 10, and the body shell 180, various parts 190, and the like to be assembled in subsequent manufacturing steps. The configuration of the vehicle 10 in a form of platform is not limited to the above configuration.

A body shell assembling step is a manufacturing step of assembling the body shell 180 to the platform vehicle 101. The platform vehicle 101 differs from a vehicle 102 in which the body shell 180 is assembled to the platform vehicle 101 (hereinafter, first assembled vehicle 102) in the appearance of the vehicle 10 due to a difference in appearance shape.

A parts assembling step is a step of assembling the exterior parts 190. The first assembled vehicle 102 differs from a vehicle 103 in which the exterior parts 190 are assembled to the first assembled vehicle 102 (hereinafter, second assembled vehicle 103) in the appearance of the vehicle 10 due to a difference in appearance shape. At least some of the interior parts may be assembled to the platform vehicle 101 before the body shell assembling step is performed and may be assembled to the platform vehicle 101 before or after the parts assembling step is performed.

As described above, the vehicle 10 is classified into a plurality of states in accordance with an appearance of the vehicle 10, varying among the plurality of manufacturing steps. At this time, a difference in appearance between the platform vehicle 101 and the first assembled vehicle 102 is, for example, smaller than a difference in appearance between the first assembled vehicle 102 and the second assembled vehicle 103. Thus, in the present embodiment, as in the case of the platform vehicle 101, a state where the vehicle 10 is in the form of platform is referred to as "platform state". As in the case of the first assembled vehicle 102 and the second assembled vehicle 103, a state where at least the body shell 180 is assembled to the platform vehicle 101 is referred to as "assembled state". In other words, in the present embodiment, the vehicle 10 is classified into a plurality of states in accordance with a difference in the appearance shape of the vehicle 10. At this time, the vehicle 10 may be classified such that the state of the vehicle 10 in one of the manufacturing steps is one of the states in accordance with whether a difference in the appearance shape of the vehicle 10 is large or small or may be classified such that the states of the vehicle 10 in a plurality of manufacturing steps are collectively one of the states. The number of manufacturing steps and the types of the manufacturing steps in the manufacturing process of the vehicle 10 and the number of the states of the vehicle 10 and the types of the states of the vehicle 10 that is classified in accordance with the plurality of manufacturing steps are not limited to the above.

In the embodiment of the disclosure, the vehicle 10 is at least any one of a vehicle 10 serving as a finished product and vehicles 101, 102, 103, 104, 105 serving as a half-finished product and a product in process in manufacturing steps of manufacturing a finished product. Hereinafter, when the vehicles 101, 102, 103, 104, 105 in the plurality of states do not need to be distinguished from one another, the vehicles 101, 102, 103, 104, 105 are simply referred to as "vehicle 10".

Figures 3, 4:
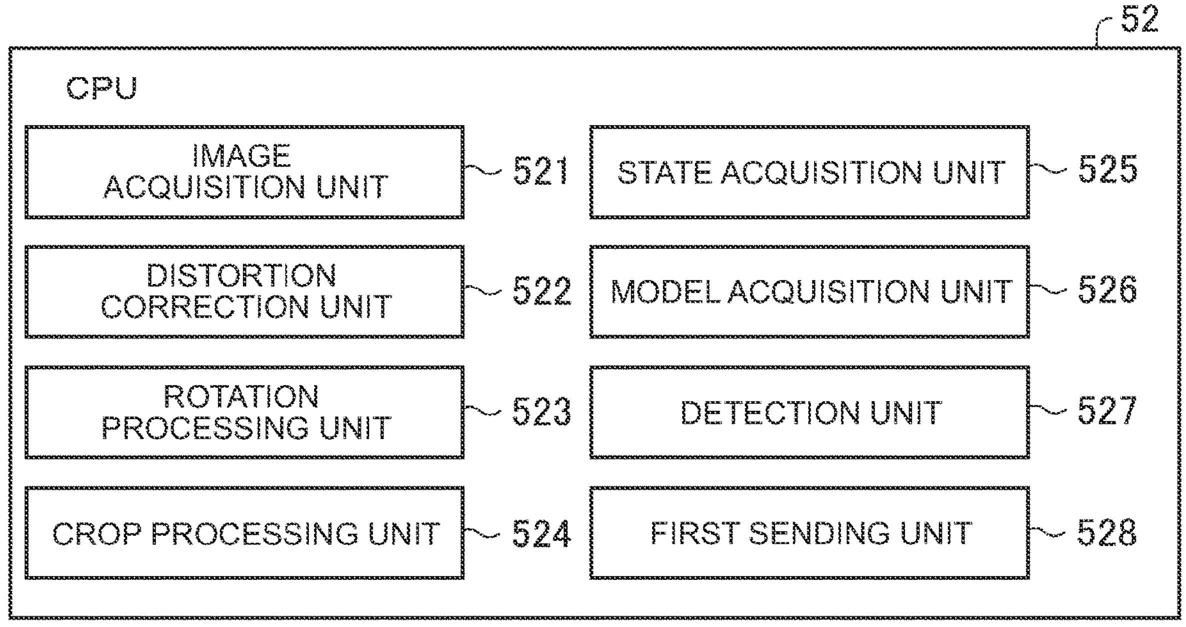
FIG. 3 is a block diagram that shows the configuration of a detecting apparatus according to the first embodiment.
FIG. 4 is a block diagram that shows the details of a CPU mounted on the detecting apparatus according to the first embodiment.

FIG. 3 is a block diagram that shows the configuration of the detecting apparatus 5 according to the first embodiment.

The detecting apparatus 5 detects at least the outer shape (outline) of the vehicle 10 contained in a captured image by, of regions in the captured image, identifying a target region that is a region representing the vehicle 10. The detecting apparatus 5 includes a communication unit 51, a storage unit 53, and a CPU 52. In the detecting apparatus 5, the communication unit 51, the storage unit 53, and the CPU 52 are connected to one another via, for example, an internal bus and an interface circuit.

The communication unit 51 of the detecting apparatus 5 connects the detecting apparatus 5 with other devices such as the vehicle controller 150, the position calculation apparatus 6, the remote controller 7, and the image capture device 9 such that communication is possible. The communication unit 51 of the detecting apparatus 5 is, for example, a wireless communication device.

The storage unit 53 of the detecting apparatus 5 stores various pieces of information including various programs for controlling the operation of the detecting apparatus 5, a first detection model Md1 serving as a detection model, a step database Db1, and a distortion correction parameter Pa1. The storage unit 53 of the detecting apparatus 5 includes, for example, a RAM, a ROM, and a hard disk drive (HDD).

A detection model is a trained machine learning model used to detect the vehicle 10 contained in a captured image. In the present embodiment, the storage unit 53 of the detecting apparatus 5 stores a plurality of first detection models Md1 each prepared one by one for the states as a detection model.

The first detection models Md1 are machine learning models trained by inputting a first training data set. The first training data set is prepared one by one for the states. The first training data set has a plurality of training images each containing the vehicle 10, and region correct labels respectively associated with a plurality of regions that make up each training image. The region correct label is a correct label indicating whether each of the regions in a training image is a target region representing the vehicle 10 or an off-target region representing an object other than the vehicle 10. In the present embodiment, each of the regions that make up a training image is one pixel that is a component of the training image. Each of the regions that make up a training image may be multiple pixels that are components of the training image. Each of the regions that make up a training image is, for example, classified to any one of a target region and an off-target region in accordance with a computed result obtained by comparing RGB values of adjacent regions that are components of the training image. Each of the regions that make up a training image may be classified to any one of a target region and an off-target region in accordance with a calculated probability that the region is a target region. When a region correct label is assigned to one of the regions that make up a training image, information indicating a position of the region with the region correct label in the training image is associated. When each of the regions that make up a training image is one pixel, information indicating a position in the training image is, for example, pixel coordinates indicating a pixel position in the training image.

The first training data set includes M (M is an integer greater than or equal to two) first training images and N (N is an integer greater than or equal to zero and less than M) second training images as a plurality of training images. The first training image is an image containing a vehicle 10 that is classified to one of the states. The second training image is an image containing a vehicle 10 that is classified to another one of the states, different from the one of the states. The number M of first training images included in the first training data set may be, for example, greater than or equal to 1.5 times the number N of second training images or may be greater than or equal to twice the number N of second training images. When there is a plurality of other states different from one of the states, the number of first training images included in the first training data set is, for example, greater than the total number of second training images respectively containing vehicles 10 classified to other states different from the one of the states. In other words, the first detection model Md1 is a machine learning model subjected to training preferentially on features of the vehicle 10 that is classified to one of the states by learning the first training image in a larger amount than the second training image.

In the present embodiment, the storage unit 53 of the detecting apparatus 5 stores two first detection models Md1*a*, Md1*b* appropriate for detection of one of the states, determined by the appearance shape of the vehicle 10. The first detection model Md1*a* is a first detection model Md1 caused to learn the vehicle 10 that is classified to the "platform state" by a larger number than the vehicle 10 that is classified to a state (for example, the "assembled state") other than the "platform state". The first detection model Md1*a* is used to detect the vehicle 10 that is classified to the "platform state". The first detection model Md1*b* is a first detection model Md1 caused to learn the vehicle 10 that is classified to the "assembled state" by a larger number than the vehicle 10 that is classified to a state (for example, the "platform state") other than the "assembled state". The first detection model Md1*b* is used to detect the vehicle 10 that is classified to the "assembled state". The number of first detection models Md1 and the type of each first detection model Md1 are not limited to the above.

In the present embodiment, when a captured image is input to the first detection model Md1, the first detection model Md1 identifies a target region among regions that make up the input captured image. Then, the first detection model Md1 masks the target region to generate a first mask image in which a mask region is added to the target region.

For example, a deep neural network (hereinafter, DNN) having the structure of a convolutional neural network (hereinafter, CNN) that implements semantic segmentation or instance segmentation is used for the algorithm of the first detection model Md1. The configuration of the first detection model Md1 is not limited to the above. The first detection model Md1 may be, for example, a trained machine learning model for which an algorithm other than a neural network is used.

The step database Db1 is a database in which state information is associated with each of a plurality of manufacturing steps. State information is information indicating one of the states of the vehicle 10. In other words, state information is information for identifying a plurality of states in the manufacturing process of the vehicle 10. The configuration of the step database Db1 is not limited to the above.

The distortion correction parameter Pa1 is a parameter used to correct a distortion of a captured image. The details of the distortion correction parameter Pa1 will be described later.

FIG. 4 is a block diagram that shows the details of the CPU 52 mounted on the detecting apparatus 5 according to the first embodiment. The CPU 52 of the detecting apparatus 5 functions as an image acquisition unit 521, a distortion correction unit 522, a rotation processing unit 523, a crop processing unit 524, a state acquisition unit 525, and a model acquisition unit 526 by expanding various programs stored in the storage unit 53 of the detecting apparatus 5. Furthermore, the CPU 52 of the detecting apparatus 5 functions as a detection unit 527 and a first sending unit 528 by expanding various programs stored in the storage unit 53 of the detecting apparatus 5.

The image acquisition unit 521 acquires a raw image from the image capture device 9.

The distortion correction unit 522 corrects a distortion of a captured image. In the present embodiment, the distortion correction unit 522 generates a corrected image in which a distortion of a raw image is corrected.

The rotation processing unit 523 rotates a captured image such that the direction of a vector indicating the moving direction of the vehicle 10 (hereinafter, a moving vector) is oriented in a predetermined direction. In the present embodiment, the rotation processing unit 523 generates a rotated image by rotating a corrected image.

The crop processing unit 524 deletes a region (hereinafter, unnecessary region) other than a region (hereinafter, necessary region) made up of the vehicle 10 and a region around the vehicle 10, from regions that make up a captured image. Thus, the crop processing unit 524 clips the necessary region from the captured image. In the present embodiment, when the vehicle 10 has moved a distance longer than a predetermined threshold, the crop processing unit 524 deletes a moved region according to the moved distance and serving as an unnecessary region from a rotated image. Thus, the crop processing unit 524 generates a processed images in which an unmoved region containing the vehicle 10 and serving as a necessary region is clipped from the rotated image.

The state acquisition unit 525 acquires step information on one of the manufacturing steps, being performed on the vehicle 10 contained in a captured image, and state information indicating one of the states of the vehicle 10 contained in the captured image. Step information is, for example, a unique identifier (ID) assigned to each of the manufacturing steps to identify the plurality of manufacturing steps included in the manufacturing process of the vehicle 10. The state acquisition unit 525 identifies one of the manufacturing steps, being performed on the vehicle 10 contained in a captured image, by, for example, detecting a feature point with which the plurality of manufacturing steps can be identified using information and the like acquired by a sensor mounted on the vehicle 10 (hereinafter, in-vehicle sensor). The in-vehicle sensor is, for example, any one of an onboard camera, an onboard lidar, and an onboard radar. The onboard camera captures the image of a state of a region around the vehicle 10. The onboard lidar and the onboard radar detect an object present in a region around the vehicle 10. Then, the state acquisition unit 525 acquires state information on the vehicle 10 contained in the captured image by identifying state information associated with one of the manufacturing steps, identified by the acquired step information using the step database Db1. A method of acquiring step information and state information is not limited to the above.

The model acquisition unit 526 acquires a first detection model Md1 selected in accordance with one of the states, identified based on the state information acquired by the state acquisition unit 525. In the present embodiment, the model acquisition unit 526 selects and acquires a first detection model Md1 according to one of the states, identified based on the state information acquired by the state acquisition unit 525 from among a plurality of first detection models Md1 stored in the storage unit 53 of the detecting apparatus 5 and prepared one by one for the states. In other words, the model acquisition unit 526 selects a first detection model Md1 caused to learn the features of the vehicle 10 that is classified to one of the states, identified based on the state information acquired by the state acquisition unit 525, by a larger amount than the features of the vehicle 10 that is classified to another one of the states, different from the one of the states. When, for example, the state of the vehicle 10 contained in a captured image is identified as "platform state" based on the state information acquired by the state acquisition unit 525, the model acquisition unit 526 acquires a first detection model Md1*a* caused to learn the vehicle 10 that is classified to the "platform state" by a larger amount than the vehicle 10 that is classified to another one of the states.

The detection unit 527 identifies a target region from among regions that make up a captured image by inputting the captured image to the first detection model Md1 acquired by the model acquisition unit 526. Thus, the detection unit 527 detects the vehicle 10 contained in the captured image. In the present embodiment, the detection unit 527 inputs a processed image to the first detection model Md1 selected by the model acquisition unit 526. Thus, a first mask image is generated from the processed image by identifying a target region from among regions that make up the processed image.

The first sending unit 528 sends various pieces of information to other apparatuses other than the detecting apparatus 5. The first sending unit 528, for example, sends a result detected by the detection unit 527 to the position calculation apparatus 6. In the present embodiment, the result detected by the detection unit 527 is a first mask image. At least one or some of the functions of the detecting apparatus 5 may be implemented as one function of any one of the vehicle controller 150, the position calculation apparatus 6, the remote controller 7, and the image capture device 9.

Figure 5:
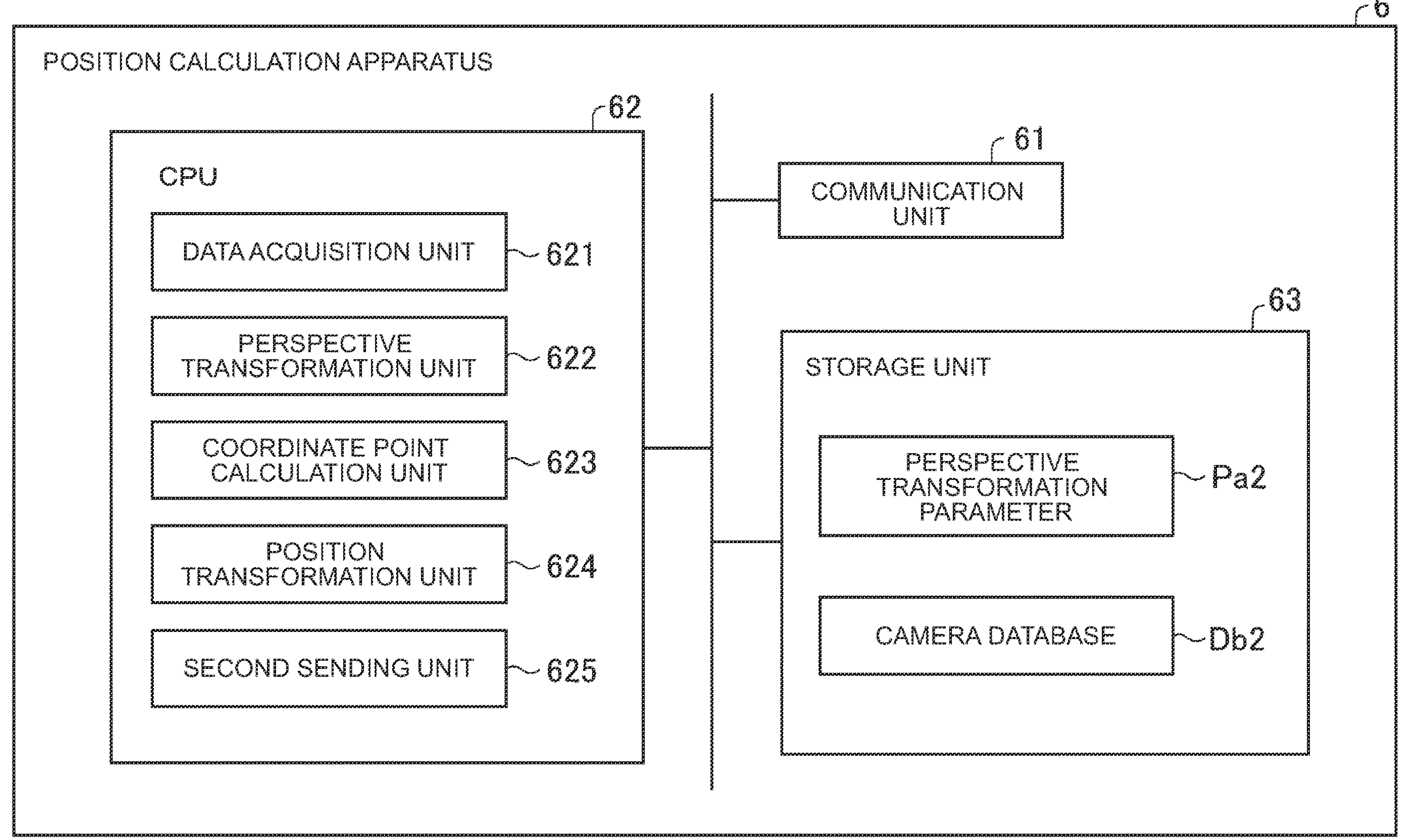
FIG. 5 is a block diagram that shows the configuration of a position calculation apparatus.

FIG. 5 is a block diagram that shows the configuration of the position calculation apparatus 6. Tho position calculation apparatus 6 calculates the position of the vehicle 10 contained in a captured image by using a result detected by the detecting apparatus 5. The position calculation apparatus 6 adopts a measuring point 10*e* of the vehicle 10 as the position of the vehicle 10. In the present embodiment, the position calculation apparatus 6 calculates the position of the vehicle 10 contained in a captured image by using a first mask image. The position calculation apparatus 6 includes a communication unit 61, a storage unit 63, and a CPU 62. In the position calculation apparatus 6, the communication unit 61, the storage unit 63, and the CPU 62 are connected to one another via, for example, an internal bus and an interface circuit.

The communication unit 61 of the position calculation apparatus 6 connects the position calculation apparatus 6 with the vehicle controller 150, the detecting apparatus 5, the remote controller 7, and the image capture device 9 such that communication is possible. The communication unit 61 of the position calculation apparatus 6 is, for example, a wireless communication device.

The storage unit 63 of the position calculation apparatus 6 stores various pieces of information including various programs for controlling the operation of the position calculation apparatus 6, a perspective transformation parameter Pa2, and a camera database Db2. The storage unit 63 of the position calculation apparatus 6 includes, for example, a RAM, a ROM, and a hard disk drive (HDD).

The perspective transformation parameter Pa2 is a parameter used to perform perspective transformation of a first mask image. The details of the perspective transformation parameter Pa2 will be described later.

The camera database Db2 is a database that shows, for each image capture device 9, an image capture parameter calculated based on an installation position of the image capture device 9 in a global coordinate system. The image capture parameter is a parameter related to a distance from a predetermined reference point of the image capture device 9. In the present embodiment, the image capture parameter is a height H (FIG. 11 (described later)) of the image capture device 9 from a road surface 20 and is a height H with respect to the road surface 20 on which the vehicle 10 is located. The camera database Db2 is, for example, a database in which camera identification information is associated with an image capture parameter on the image capture device 9 identified by the camera identification information. The configuration of the camera database Db2 is not limited to the above. An image capturing range RG, an installation position, an installation angle, and the like of the image capture device 9 may be associated with camera identification information.

The CPU 62 of the position calculation apparatus 6 functions as a data acquisition unit 621, a perspective transformation unit 622, a coordinate point calculation unit 623, a position transformation unit 624, and a second sending unit 625 by expanding various programs stored in the storage unit 63 of the position calculation apparatus 6.

The data acquisition unit 621 acquires various pieces of information. In the present embodiment, the data acquisition unit 621 acquires a first mask image from the detecting apparatus 5. Furthermore, the data acquisition unit 621 acquires an image capture parameter on the image capture device 9 that is a source that acquires an analysis target raw image by consulting the camera database Db2 stored in the storage unit 63 of the position calculation apparatus 6.

The perspective transformation unit 622 generates a second mask image by performing perspective transformation of a first mask image. The coordinate point calculation unit 623 calculates an image coordinate point by correcting a first coordinate point using a second coordinate point. The first coordinate point is a coordinate point, in an image coordinate system, of a designated vertex of a first circumscribed rectangle set for a mask region in the first mask image. The second coordinate point is a coordinate point, in an image coordinate system, indicating the same position as the first coordinate point among vertexes of a second circumscribed rectangle set for a mask region in the second mask image. The image coordinate point is a coordinate point indicating the position of the vehicle 10 in the image coordinate system. The position transformation unit 624 transforms the image coordinate point to a vehicle coordinate point by using the image capture parameter acquired by the data acquisition unit 621 and the image coordinate point calculated by the coordinate point calculation unit 623. The vehicle coordinate point is a coordinate point indicating the position of the vehicle 10 in the global coordinate system.

The second sending unit 625 sends various pieces of information to other devices other than the position calculation apparatus 6. The second sending unit 625, for example, sends the vehicle coordinate point to the remote controller 7 as information indicating the position of the vehicle 10. At least one or some of the functions of the position calculation apparatus 6 may be implemented as one function of any one of the vehicle controller 150, the detecting apparatus 5, the remote controller 7, and the image capture device 9.

Figure 6:
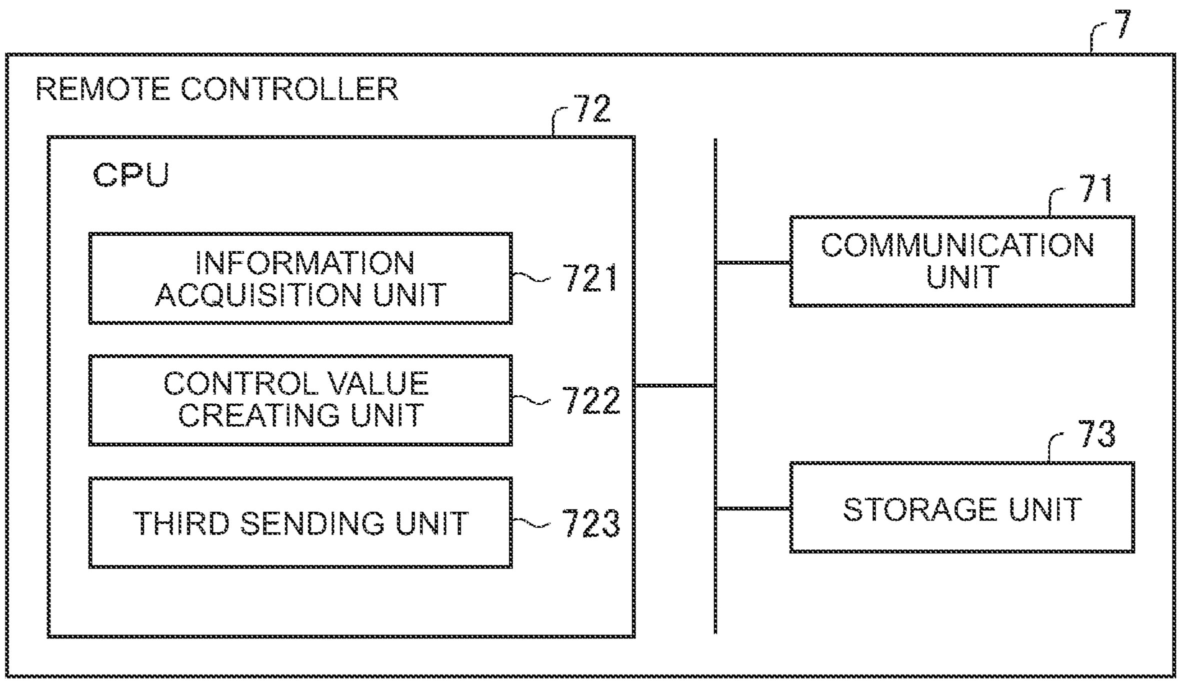
FIG. 6 is a block diagram that shows the configuration of a remote controller.

FIG. 6 is a block diagram that shows the configuration of the remote controller 7. The remote controller 7 creates a control value that defines the driving operation of the vehicle 10 by using the position information and the like of the vehicle 10 and sends the control value to the vehicle 10. Thus, the remote controller 7 performs remote control on the operation of the vehicle 10. The remote controller 7 includes a communication unit 71, a storage unit 73, and a CPU 72. The communication unit 71, the storage unit 73, and the CPU 72 of the remote controller 7 are connected to one another via, for example, an internal bus and an interface circuit. The communication unit 71 of the remote controller 7 connects the remote controller 7 to the vehicle controller 150, the detecting apparatus 5, the position calculation apparatus 6, and the image capture device 9 such that communication is possible. The communication unit 71 of the remote controller 7 is, for example, a wireless communication device. The storage unit 73 of the remote controller 7 stores various programs for controlling the operation of the remote controller 7. The storage unit 73 of the remote controller 7 includes, for example, a RAM, a ROM, and a hard disk drive (HDD).

The CPU 72 of the remote controller 7 functions as an information acquisition unit 721, a control value creating unit 722, and a third sending unit 723 by expanding various programs stored in the storage unit 73 of the remote controller 7.

The information acquisition unit 721 acquires various pieces of information. The information acquisition unit 721, for example, acquires information on the driving condition of the vehicle 10 (hereinafter, travel information). The travel information includes, for example, the vehicle coordinate point sent from the remote controller 7 as information indicating the position of the vehicle 10, the travel speed and actual steering angle of the vehicle 10, sent from the vehicle controller 150, and travel route information stored in advance in the storage unit 73 of the remote controller 7. The travel route information is information indicating a target travel route of the vehicle 10 that runs in the remote automated driving mode. The types of information included in the travel information are not limited to the above.

The control value creating unit 722 creates a control value that defines the driving operation of the vehicle 10 by using the travel information acquired by the information acquisition unit 721. Specifically, the control value creating unit 722 creates, for example, a reference control value and a corrected control value. The reference control value is a control value for causing the vehicle 10 to run along a target travel route. The corrected control value is a control value for correcting a relative position of the vehicle 10 with respect to the target travel route. Each of the reference control value and the corrected control value includes, for example, an acceleration control value that defines the acceleration of the vehicle 10 in a forward traveling direction and a steering angle control value that defines the steering angle of the vehicle 10. Each of the reference control value and the corrected control value may be a control value including any one of a trajectory control value and a destination control value instead of the acceleration control value and the steering angle control value. The trajectory control value is a control value that defines a moving path of the vehicle 10 by arranging target moving positions set at predetermined time intervals of the vehicle 10 in time-series order. The destination control value is a control value indicating target arrival time to a target arrival place of the vehicle 10.

The third sending unit 723 sends various pieces of information to other devices other than the remote controller 7. The third sending unit 723, for example, sends a control value created by the control value creating unit 722 to the vehicle 10 that is a target to be controlled. At least one or some of the functions of the remote controller 7 may be implemented as one function of any one of the vehicle controller 150, the detecting apparatus 5, the position calculation apparatus 6, and the image capture device 9.

A-2. Detecting Method and Location Calculation Method for Vehicle

Figure 7:
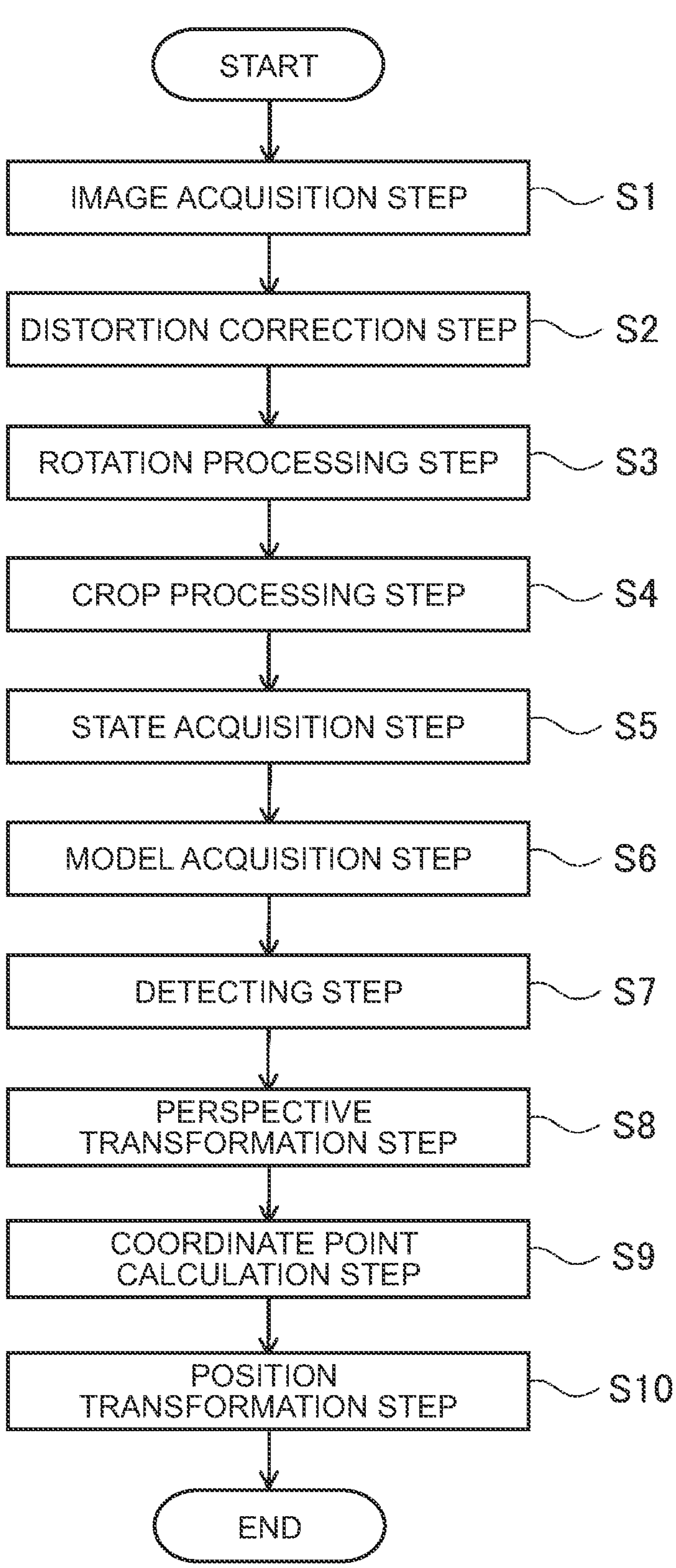
FIG. 7 is a flowchart that shows a detecting method and a position calculation method for a vehicle according to the first embodiment.

FIG. 7 is a flowchart that shows a detecting method and a position calculation method for the vehicle 10 according to the first embodiment. The method shown in FIG. 7 is, for example, repeatedly executed at predetermined time intervals at or after the vehicle 10 that is a target to be detected starts running in the remote automated driving mode.

Figure 8:
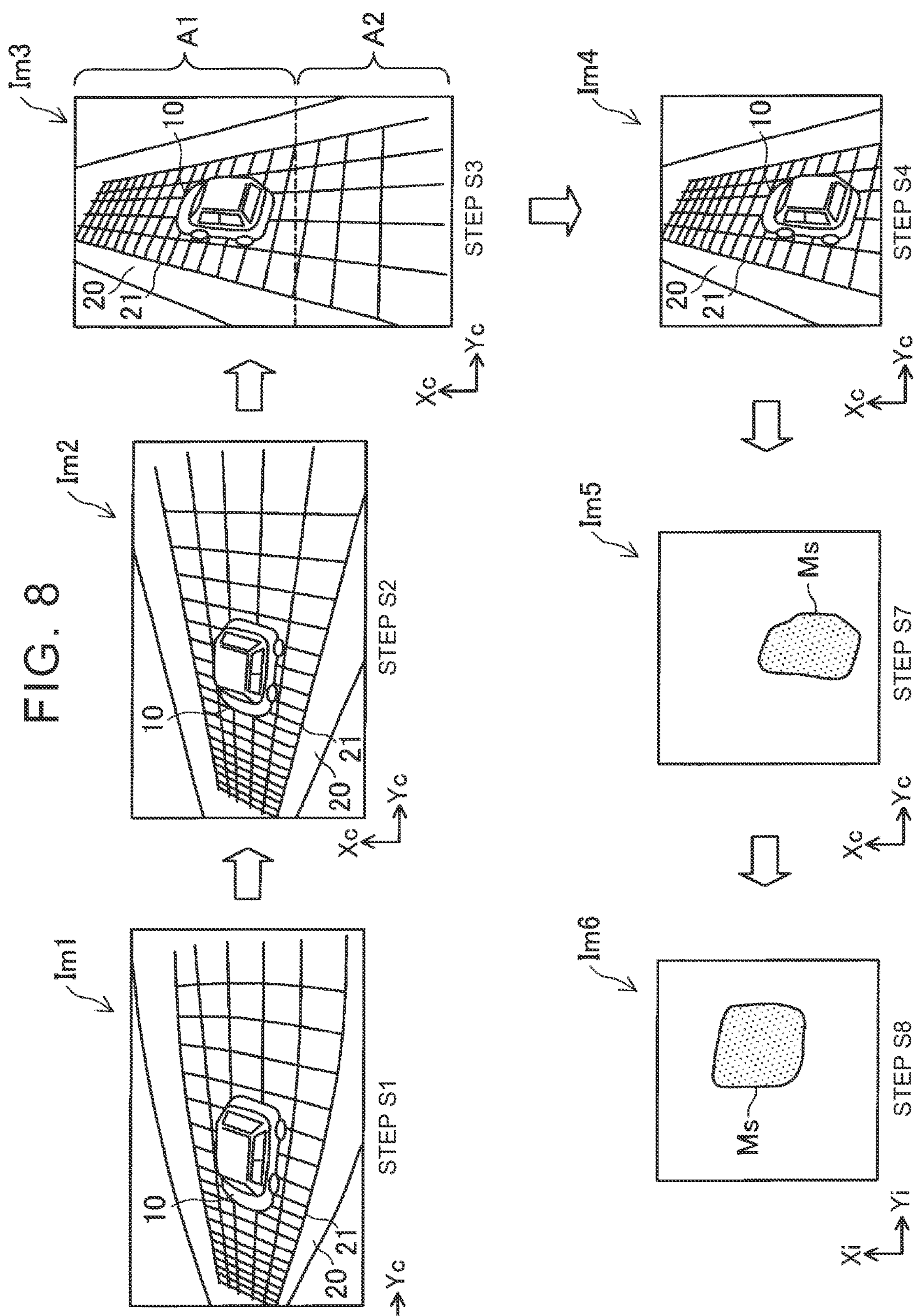
FIG. 8 is a schematic view that shows examples of various images.

FIG. 8 is a schematic view that shows examples of various images when the detecting method and the position calculation method shown in FIG. 7 are executed. In FIG. 8, step numbers corresponding to the steps of FIG. 7 are assigned. In the present embodiment, a case where the vehicle 10 10 runs (moves) in a traveling direction on the road surface 20 on which mesh grid lines 21 respectively drawn along an Xg-axis parallel to the traveling direction of the vehicle 10 and a Yg-axis orthogonal to the Xg-axis will be described as an example. The Xg-axis and the Yg-axis are coordinate axes in the global coordinate system. In another embodiment, the grid lines 21 may be omitted.

As shown in FIG. 7, initially, an image acquisition step (step S1) is executed. As shown in FIG. 8, the image acquisition step is a step of acquiring a raw image Im1 containing the vehicle 10. In the present embodiment, in the image acquisition step, the image acquisition unit 521 acquires the raw image Im1 from the image capture device 9.

As shown in FIG. 7, subsequent to the image acquisition step, a distortion correction step (step S2) is executed. The distortion correction step is a step of correcting a distortion of a captured image. In the present embodiment, as shown in FIG. 8, in the distortion correction step, the distortion correction unit 522 generates a corrected image Im2 by correcting a distortion of the raw image Im1. Specifically, the distortion correction unit 522, for example, corrects a distortion of the raw image Im1 by using the distortion correction parameter Pa1 stored in advance in the storage unit 53 of the detecting apparatus 5. The distortion correction parameter Pa1 is, for example, a parameter related to position information of the grid lines 21, obtained through calibration. The distortion correction method is not limited to the above. The distortion correction parameter Pa1 may be a selected parameter other than the above.

As shown in FIG. 7, subsequent to the distortion correction step, a rotation processing step (step S3) is executed. The rotation processing step is a step of rotating the captured image such that the direction of the moving vector of the vehicle 10 contained in the captured image is oriented in the predetermined direction. In the present embodiment, as shown in FIG. 8, in the rotation processing step, the rotation processing unit 523 rotates the corrected image Im2 such that the direction of the moving vector of the vehicle 10 contained in the corrected image Im2 is oriented in the predetermined direction. Thus, the rotation processing unit 523 generates a rotated image Im3. Specifically, the rotation processing unit 523, for example, rotates the corrected image Im2 about the center of gravity of the vehicle 10 in the corrected image Im2 such that the direction of the moving vector of the vehicle 10 is oriented upward on a screen of a display device that shows the corrected image Im2. The movement of the feature point (for example, the center of gravity) of the vehicle 10 can be, for example, represented as the direction of the moving vector by an optical flow method. A moving vector amount and moving vector direction of the vehicle 10 are estimated based on, for example, a change in position, between image frames, of the feature point set as needed on the corrected image Im2. The rotation processing method is not limited to the above.

As shown in FIG. 7, subsequent to the rotation processing step, a crop processing step (step S4) is executed. The crop processing step is a step of clipping a necessary region from a captured image. In the present embodiment, as shown in FIG. 8, in the crop processing step, when the vehicle 10 has moved a distance longer than a predetermined threshold, the crop processing unit 524 deletes a moved region A2 according to the distance the vehicle 10 has moved from the rotated image Im3 as an unnecessary region. Thus, the crop processing unit 524 generates a processed image Im4 in which an unmoved region A1 containing the vehicle 10 is clipped from the rotated image Im3 as a necessary region. At this time, the crop processing unit 524, for example, estimates the moved region A2 by recognizing a distance that the vehicle 10 has moved from the estimated moving vector amount of the vehicle 10. In the detecting method for the vehicle 10, any of the rotation processing step and the crop processing step may be executed first. A crop processing method is not limited to the above.

As shown in FIG. 7, subsequent to the crop processing step, a state acquisition step (step S5) is executed. The state acquisition step is a step of acquiring state information indicating one of the states of the vehicle 10 contained in the captured image. In the present embodiment, in the state acquisition step, the state acquisition unit 525 initially acquires step information on one of the manufacturing steps, being performed on the vehicle 10 contained in the captured image. Then, the state acquisition unit 525 identifies state information associated with one of the manufacturing steps, identified based on the acquired step information using the step database Db1. Thus, the state acquisition unit 525 acquires state information on the vehicle 10 contained in the captured image. The state acquisition step just needs to be executed at any point in time after the image acquisition step is complete and before a detecting step (step S7) is started.

Subsequent to the state acquisition step, a model acquisition step (step S6) is executed. The model acquisition step is a step of acquiring a first detection model Md1 selected in accordance with one of the states, identified based on the state information acquired in the state acquisition step from among a plurality of first detection models Md1 each prepared one by one for the states. In the present embodiment, in the model acquisition step, the model acquisition unit 526 selects and acquires a first detection model Md1 according to one of the states, identified based on the state information acquired in the state acquisition step, from among a plurality of first detection models Md1 stored in advance in the storage unit 53 of the detecting apparatus 5. The model acquisition step just needs to be executed at any point in time after the state acquisition step is complete and before the detecting step is started.

Subsequent to the model acquisition step, the detecting step is executed. As shown in FIG. 8, the detecting step is a step of detecting the outer shape of the vehicle 10 continued in the captured image by using a detection model, such as the first detection model Md1. In the present embodiment, in the detecting step, the detection unit 527 inputs the processed image Im4 to the first detection model Md1 selected in the model acquisition step. Thus, the detection unit 527 detects the outer shape of the vehicle 10 contained in the processed image Im4. Then, the detection unit 527 generates a first mask image Im5 in which a mask region Ms is added to a target region by masking the target region in the processed image Im4. The first sending unit 528 sends the first mask image Im5 to the position calculation apparatus 6. The detecting method for the vehicle 10 is not limited to the above.

As shown in FIG. 7, subsequent to the detecting step, a perspective transformation step (step S8) is executed. The perspective transformation step is a step of performing perspective transformation of the first mask image Im5. In the perspective transformation step, the data acquisition unit 621 acquires the first mask image Im5 from the detecting apparatus 5. Then, the perspective transformation unit 622 generates a second mask image Im6 by performing perspective transformation of the first mask image Im5. Specifically, the perspective transformation unit 622, for example, performs perspective transformation of a bird's eye image when the first mask image Im5 is viewed from an eyepoint above the vehicle 10 (for example, just above the vehicle 10) substantially vertical to the road surface 20 by using the perspective transformation parameter Pa2 stored in advance in the storage unit 63 of the position calculation apparatus 6. The perspective transformation parameter Pa2 is, for example, a parameter on the position information of the image capture device 9, obtained through calibration, and an internal parameter. Thus, the perspective transformation unit 622 generates a second mask image Im6 shown in the image coordinate system from the first mask image Im5 shown in the camera coordinate system. The image coordinate system is a coordinate system having one point of an image plane onto which an image is projected through perspective transformation as an origin and having coordinate axes represented by an Xi-axis and a Yi-axis orthogonal to the Xi-axis. The perspective transformation method is not limited to the above. The perspective transformation parameter Pa2 may be a selected parameter other than the above.

As shown in FIG. 7, subsequent to the perspective transformation step, a coordinate point calculation step (step S9) is executed. FIG. 9 is a view for illustrating the details of the coordinate point calculation step. The coordinate point calculation step is a step of calculating an image coordinate point P3 indicating the position of the vehicle 10 in the image coordinate system.

Figure 10:
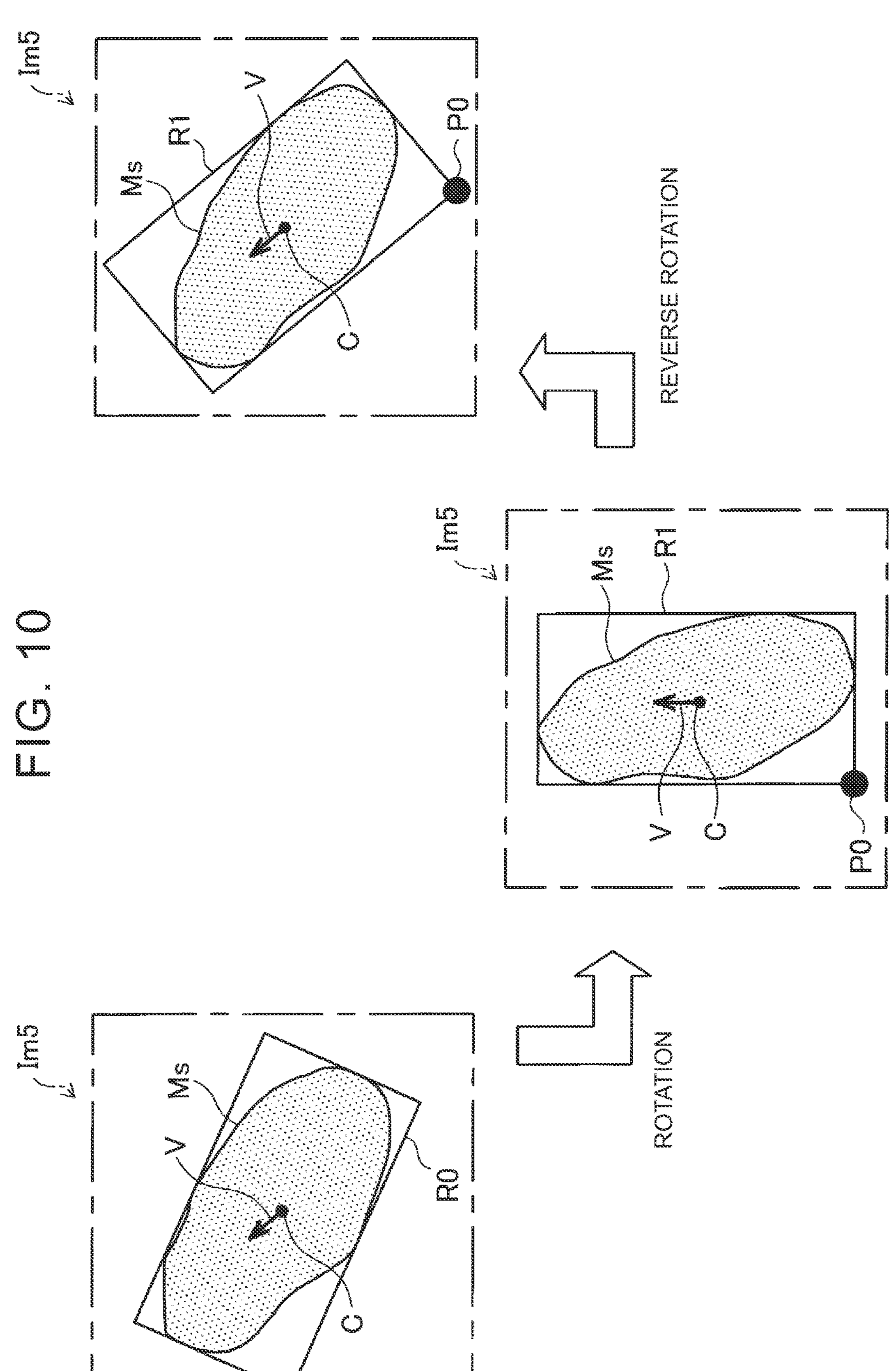
FIG. 10 is a view for illustrating a calculation method for a base coordinate point.

In the coordinate point calculation step, the coordinate point calculation unit 623 calculates a base coordinate point P0 from a first circumscribed rectangle R1 set for the mask region Ms in the first mask image Im5 that is an image before perspective transformation. FIG. 10 is a view for illustrating a calculation method for the base coordinate point P0. To calculate the base coordinate point P0, the coordinate point calculation unit 623 sets a base circumscribed rectangle R0 for the mask region Ms in the first mask image Im5. Subsequently, the coordinate point calculation unit 623 rotates the first mask image Im5 by a necessary rotation amount about the center of gravity C of the mask region Ms such that the direction of the moving vector V of the vehicle 10 corresponding to the mask region Ms in the first mask image Im5 is oriented in the predetermined direction. The predetermined direction is, for example, an upward direction on the screen of the display device that shows the first mask image Im5. Subsequently, the coordinate point calculation unit 623 sets a first circumscribed rectangle R1 for the mask region Ms of the rotated first mask image Im5 such that the long sides are parallel to the direction of the moving vector. Subsequently, the coordinate point calculation unit 623 rotates the first mask image Im5, to which the first circumscribed rectangle R1 is added, in a reverse direction by the rotation amount about the center of gravity C of the mask region Ms. Thus, the coordinate point calculation unit 623 sets the base coordinate point P0 to the coordinate point of a vertex that is one of four vertexes of the first circumscribed rectangle R1 with coordinates closest in distance to the measuring point 10*e* of the vehicle 10. Then, as shown in FIG. 9, the coordinate point calculation unit 623 performs perspective transformation of the first mask image Im5 after reverse rotation, that is, the first mask image Im5 after the base coordinate point P0 is calculated. Thus, the coordinate point calculation unit 623 sets a first coordinate point P1 to the coordinate point corresponding to the base coordinate point P0 in the first circumscribed rectangle R1 deformed through perspective transformation.

Furthermore, the coordinate point calculation unit 623 sets a second circumscribed rectangle R2 for the mask region Ms in the second mask image Im6 obtained by performing perspective transformation of the first mask image Im5. Then, the coordinate point calculation unit 623 sets a second coordinate point P2 to a vertex indicating the same position as the first coordinate point P1 among the vertexes of the second circumscribed rectangle R2. In other words, the first coordinate point P1 and the second coordinate point P2 are coordinate points that indicate the same position, so the first coordinate point P1 and the second coordinate point P2 correlate with each other.

Furthermore, the coordinate point calculation unit 623 performs correction to replace coordinates (Xi1, Yi1) of the first coordinate point P1 with coordinates (Xi2, Yi2) of the second coordinate point P2 in accordance with the magnitude relation between the coordinate values of the first coordinate point P1 and the coordinate values of the second coordinate point P2. When the coordinate value Xi1 of the first coordinate point P1 in the Xi direction is greater than the coordinate value Xi2 of the second coordinate point P2 in the Xi direction (Xi1>Xi2), the coordinate point calculation unit 623 replaces the coordinate value Xi1 of the first coordinate point P1 in the Xi direction with the coordinate value Xi2 of the second coordinate point P2 in the Xi direction. When the coordinate value Yi2 of the first coordinate point P1 in the Yi direction is greater than the coordinate value Yi2 of the second coordinate point P2 in the Yi direction (Yi1>Yi2), the coordinate point calculation unit 623 replaces the coordinate value Yi1 of the first coordinate point P1 in the Yi direction with the coordinate value Yi2 of the second coordinate point P2 in the Yi direction. In the example shown in FIG. 9, the coordinate value Xi1 of the first coordinate point P1 in the Xi direction is greater than the coordinate value Xi2 of the second coordinate point P2 in the Xi direction. The coordinate value Yi1 of the first coordinate point P1 in the Yi direction is less than the coordinate value Yi2 of the second coordinate point P2 in the Yi direction. Thus, an image coordinate point P3 has coordinates (Xi2, Yi1). In this way, the coordinate point calculation unit 623 calculates an image coordinate point P3 indicating the position of the vehicle 10 in the image coordinate system by correcting the first coordinate point P1 using the second coordinate point P2. The calculation method for the image coordinate point P3 is not limited to the above.

As shown in FIG. 7, subsequent to the coordinate point calculation step, a position transformation step (step S10) is executed. The position transformation step is a step of calculating a vehicle coordinate point indicating the position of the vehicle 10 in the global coordinate system by transforming the image coordinate point P3 to the vehicle coordinate point. In the position transformation step, the position transformation unit 624 transforms the image coordinate point P3 to the vehicle coordinate point by using the image capture parameter acquired by the data acquisition unit 621 and a vehicle parameter. The vehicle parameter is a parameter on a distance from the reference point that is the measuring point 10*e* of the vehicle 10. In the present embodiment, the vehicle parameter is a height h (FIG. 11 (described later)) from the road surface 20 at the measuring point 10*e* of the vehicle 10.

The position transformation unit 624 transforms the image coordinate point P3 to the vehicle coordinate point by using relational expressions (1) to (3) (described later), including the vehicle coordinate point as a response variable and including the image coordinate point P3, the image capture parameter, and the vehicle parameter as explanatory variables. In this case, the position transformation unit 624 substitutes the coordinate values of the image coordinate point P3, calculated by the coordinate point calculation unit 623, into the relational expressions expressed by the expressions (1) to (3). Furthermore, the position transformation unit 624 substitutes the image capture parameter acquired by the data acquisition unit 621, that is, the values of the image capture parameter corresponding to the image capture device 9 that has acquired the raw image Im1, into the relational expressions expressed by the expressions (1) to (3).

Figure 11:
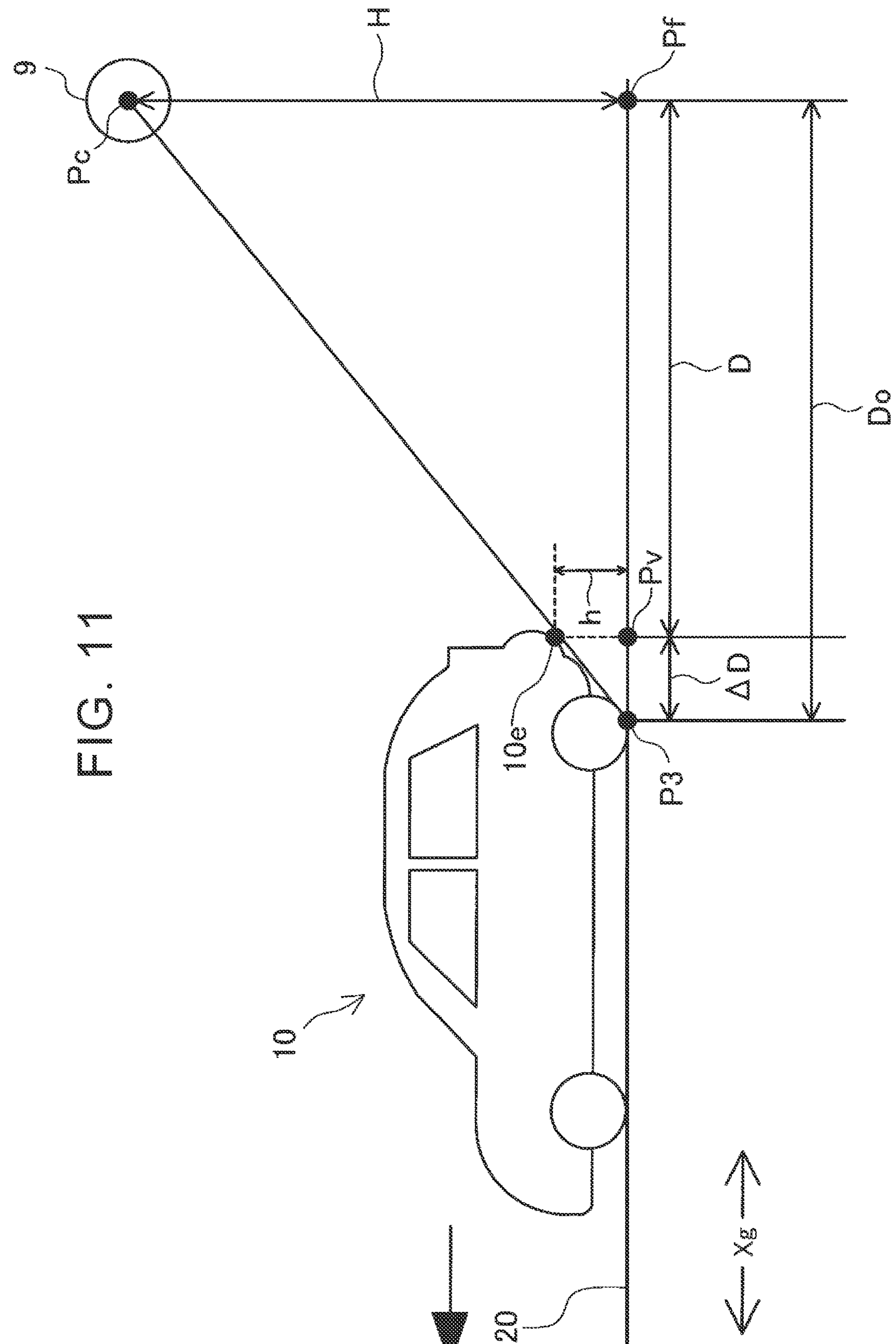
FIG. 11 is a first view for illustrating the details of a position transformation step.
Figure 12:
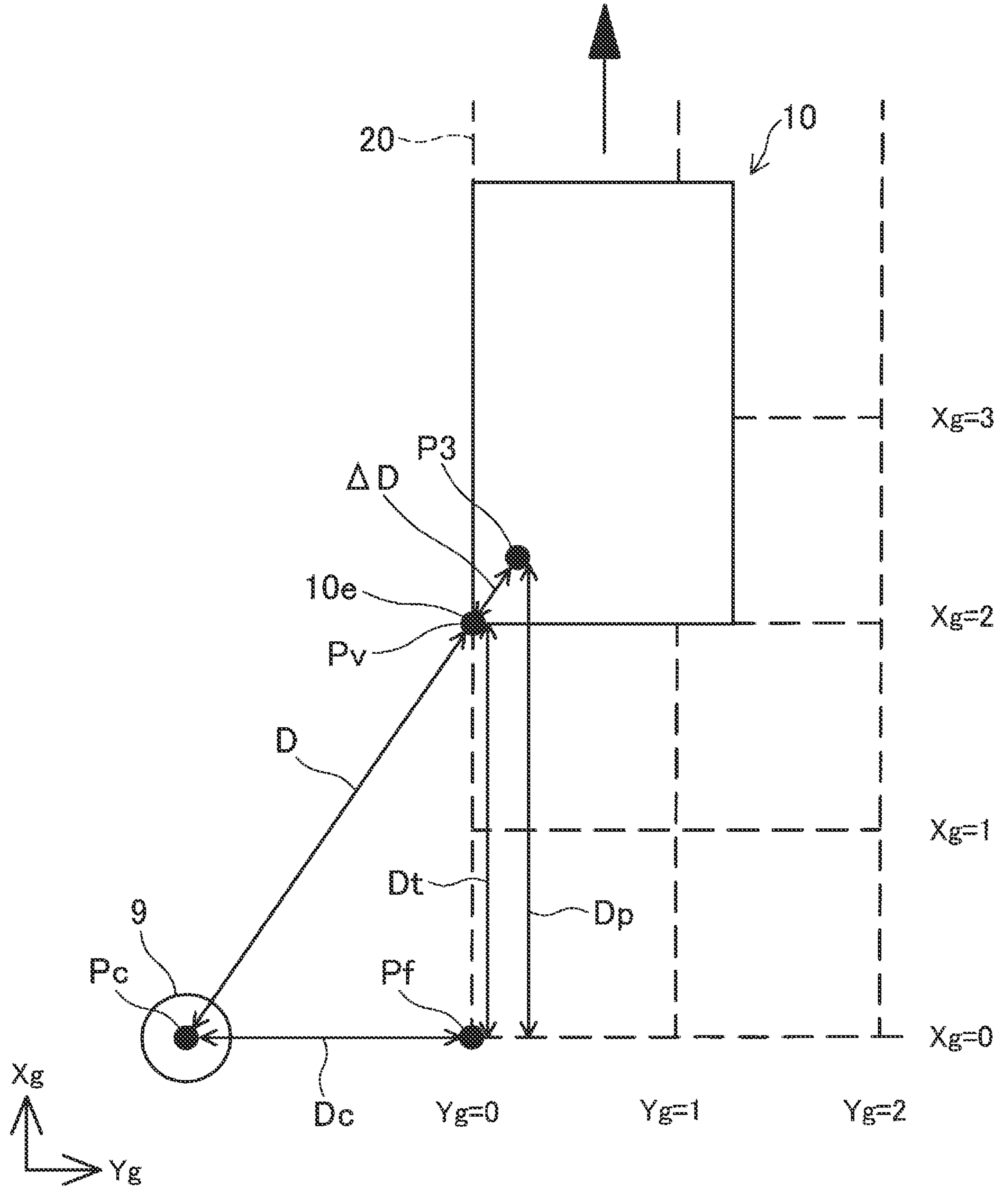
FIG. 12 is a second view for illustrating the details of the position transformation step.

FIG. 11 is a first view for illustrating the details of the position transformation step. FIG. 11 shows a state when the vehicle 10 is viewed from the left-hand side. FIG. 12 is a second view for illustrating the details of the position transformation step. FIG. 12 shows a state when the vehicle 10 is viewed from a roof side. The global coordinate system shown in FIG. 11 and FIG. 12 is a coordinate system having an origin set at a fixed coordinate point Pf indicating a selected reference position of the road surface 20 and having coordinate axes represented by an Xg-axis and a Yg-axis orthogonal to the Xg-axis. An image capture coordinate point Pc is a coordinate point indicating the position of the image capture device 9 that has acquired the raw image Im1 used to calculate the image coordinate point P3 and indicating the position of the image capture device 9 in the global coordinate system. The fixed coordinate point Pf and the image capture coordinate point Pc are stored in advance in the storage unit 63 of the position calculation apparatus 6.

As shown in FIG. 11, an observation distance in an Xg-Yg plane between the position of the image capture device 9 and the position (image coordinate point P3) of the vehicle 10 is defined as Do. An observation error is defined as ΔD. A height [m] of the image capture device 9 from the road surface 20 as an image capture parameter is defined as H. A height [m] of the measuring point 10*e* of the vehicle 10 from the road surface 20 as a vehicle parameter is defined as h. In this case, the observation error ΔD is expressed by the following expression (1).

$$\Delta D = h/H \times Do \tag{1}$$

In other words, the observation error ΔD increases as the observation distance Do increases.

Subsequently, where an actual distance between the position of the image capture device 9 and the position of the measuring point 10*e* of the vehicle 10 (hereinafter, first distance) is D, the first distance D is expressed by the following expression (2).

$$D = Do \times (1 - h/H) \tag{2}$$

In other words, the first distance D is determined based on the observation distance Do, the height H of the image capture device 9, serving as an image capture parameter, and the height h of the measuring point 10*e* of the vehicle 10, serving as a vehicle parameter.

Then, as shown in FIG. 12, where an estimated distance between the reference position and the position of the vehicle 10 is Dp and an actual distance between the reference position and the vehicle 10 (hereinafter, second distance) is Dt, the second distance Dt is expressed by the following expression (3).

$$Dt = Dp \times (1 - h/H) \tag{3}$$

Here, the estimated distance Dp can be calculated by using an actual distance obtained from the fixed coordinate point Pf and the image capture coordinate point Pc (hereinafter, third distance Dc), the image coordinate point P3, and the fixed coordinate point Pf. Therefore, the position transformation unit 624 is allowed to calculate a vehicle coordinate point Pv by using the fixed coordinate point Pf and the second distance Dt obtained by correcting the estimated distance Dp using the expression (3). At this time, the calculated vehicle coordinate point Pv is a coordinate point indicating the position of the vehicle 10 in the global coordinate system, so the calculated vehicle coordinate point Pv corresponds to the position of the vehicle 10 in an actual space. The second sending unit 625 sends the vehicle coordinate point Pv to the remote controller 7.

A-3. Operation Control Method for Vehicle

Figure 13:
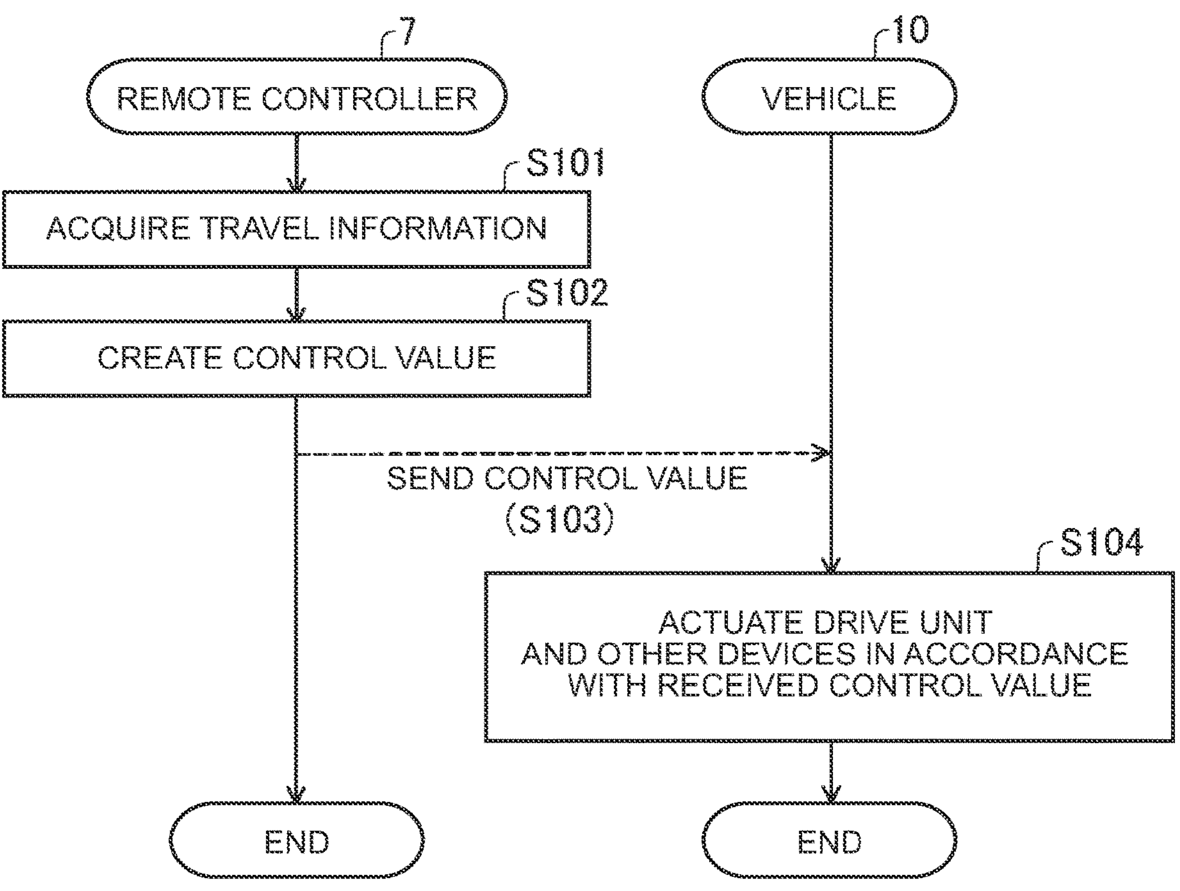
FIG. 13 is a flowchart that shows an operation control method for a vehicle.

FIG. 13 is a flowchart that shows an operation control method for the vehicle 10 that moves in the remote automated driving mode. The operation control method shown in FIG. 13 is, for example, repeatedly executed each time the vehicle coordinate point Pv is received from the position calculation apparatus 6 as information indicating the position of the vehicle 10.

The information acquisition unit 721 of the remote controller 7 acquires travel information including the vehicle coordinate point Pv (step S101). Then, the control value creating unit 722 creates a control value that defines the driving operation of the vehicle 10 by using the travel information (step S102). Then, the third sending unit 723 sends the control value to the vehicle 10 (step S103). The vehicle controller 150 mounted on the vehicle 10 drives the drive unit 110 and the like in accordance with the received control value (step S104).

According to the first embodiment, when the vehicle 10 is caused to automatically move by remote control, the position calculation system 1 is capable of calculating the position of the vehicle 10 by using a captured image containing the vehicle 10. Specifically, the detecting apparatus 5 inputs a captured image to a detection model that is a machine learning model capable of detecting the vehicle 10 contained in the captured image. Thus, the detecting apparatus 5 is capable of detecting the vehicle 10 contained in the captured image. Then, the position calculation apparatus 6 is capable of calculating a vehicle coordinate point Pv indicating the position of the vehicle 10 contained in the captured image by using a first mask image Im5 that is a result detected by the detecting apparatus 5.

Here, the vehicle 10 has an appearance that varies among the plurality of manufacturing steps, so the vehicle 10 can be classified into a plurality of states in accordance with a difference in appearance. Thus, features extracted at the time of training a detection model depend on the appearance state of the vehicle 10. Therefore, when a detection model caused to learn only a plurality of training images respectively containing the vehicles 10 classified to different states in the same number for the states is also applied to all of the vehicles 10 respectively classified to the states, the accuracy of detecting the vehicle 10 in one or some of the states can decrease. When the accuracy of detecting the vehicle 10 in one or some of the states decreases, it is conceivable to train the detection model again by adding a training image containing the vehicle 10 in the one or some of the states, of which the detection accuracy has decreased. However, when a training image containing the vehicle 10 in one or some of the states is learned by a larger amount than a training image containing the vehicle 10 in the other states, features contained in an added training image may be more intensively learned than the other features. As a result, there can be a new difference in detection accuracy among a plurality of states. When the accuracy of detecting the vehicle 10 contained in a captured image decreases, the accuracy of calculating the vehicle coordinate point Pv indicating the position of the vehicle 10 decreases. When the accuracy of calculating the vehicle coordinate point Pv decreases, a desired control value may not be created.

For this reason, in the first embodiment, the first detection model Md1 is caused to learn a first training image containing the vehicle 10 that is classified to one of the states by a larger amount than a second training image containing the vehicle 10 that is classified to another one of the states. Thus, the first detection model Md1 appropriate for detection of the vehicle 10 that is classified to the one of the states is prepared one by one for the states. According to the first embodiment, the detecting apparatus 5 is capable of acquiring state information indicating one of the states of the vehicle 10 contained in a captured image and select a first detection model Md1 according to the one of the states, identified by the acquired state information, from among a plurality of the first detection models Md1 prepared one by one for the states. In other words, when the position or the like of the vehicle 10 that moves in a factory is calculated, it is possible to select a first detection model Md1 according to the state of the vehicle 10 that can be classified to any one of the plurality of states in accordance with an appearance of the vehicle 10, varying among the plurality of manufacturing steps. Then, the detecting apparatus 5 inputs a captured image to the first detection model Md1 according to the state of the vehicle 10 contained in the captured image. Thus, the detecting apparatus 5 is capable of accurately detecting the vehicle 10 contained in the captured image. In other words, when the first detection model Md1 appropriate for detection of the vehicle 10 that is classified to one of the states is selected, it is possible to accurately classify regions that make up the captured image into a target region and an off-target region. Thus, it is possible to suppress a decrease in the accuracy of detecting the vehicle 10 contained in a captured image in accordance with a difference in appearance among the plurality of manufacturing steps. As a result, it is possible to suppress a decrease in the accuracy of calculating the vehicle coordinate point Pv. Thus, it is possible to reduce a difference between the position of the vehicle 10, calculated by the position calculation apparatus 6, and an actual position of the vehicle 10. Thus, it is possible to create a further appropriate control value.

According to the first embodiment, the first training data set includes M (M is an integer greater than or equal to two) first training images and N (N is an integer greater than or equal to zero and less than M) second training images. At this time, the first training data set may include only first training images without including a second training image. In this case, for example, as the number M of first training images each containing the vehicle 10 that is classified to one of the states is increased, it is possible to improve the detection accuracy of the first detection model Md1. The first training data set may include first training images and second training images in number N less than the number of the first training images. In this case, since the first training data set contains second training images, it is possible to, for example, improve the accuracy of detecting a part having the same appearance irrespective of one of the states in the vehicle 10.

According to the first embodiment, when the form of the vehicle 10 is a form of platform, the state of the vehicle 10 is allowed to be classified to the platform state. Then, when the vehicle 10 that is classified to the platform state is detected, it is possible to detect the vehicle 10 by selecting a first detection model Md1 appropriate for detection of the vehicle 10 that is classified to the platform state and inputting a captured image. When the vehicle 10 that is classified to the platform state is detected, it is possible to detect the vehicle 10 by inputting a captured image associated with the fact that the vehicle 10 is in the platform state to a second detection model Md2. Thus, it is possible to improve the accuracy of detecting the vehicle 10 that is classified to the platform state.

According to the first embodiment, when a platform vehicle 101 in the form of platform is contained in a captured image, it is possible to detect the outer shape of the platform vehicle 101. Thus, not only for a vehicle 10 serving as a finished vehicle but also for a vehicle 10 serving as a half-finished product and a product in process, it is possible to calculate the position of the vehicle 10 by using a captured image.

According to the first embodiment, the platform vehicle 101 significantly differs in appearance from the first assembled vehicle 102 and the second assembled vehicle 103. Thus, before and after assembling of a vehicle body such as the body shell 180, it is possible to classify the state of the vehicle 10 into the platform state and the assembled state. Thus, it is possible to suppress a decrease in the accuracy of detecting the vehicle 10 contained in a captured image in accordance with a difference in the appearance shape of the vehicle 10 before and after a vehicle body is assembled.

According to the first embodiment, when the vehicle 10 contained in a captured image is detected, it is possible to generate a corrected image Im2 by correcting a distortion of a raw image Im1. With this configuration, it is possible to improve the accuracy of detecting the vehicle 10 contained in a captured image. Thus, it is possible to further improve the accuracy of calculating the position of the vehicle 10.

According to the first embodiment, when the vehicle 10 contained in a captured image is detected, a corrected image Im2 is rotated such that the direction of the moving vector V of the vehicle 10 is oriented in a predetermined direction, so it is possible to generate a rotated image Im3. As a result, it is possible to detect the vehicle 10 contained in the captured image in a state where the direction of the moving vector V is unified. Thus, it is possible to improve the accuracy of detecting the vehicle 10 contained in the captured image.

According to the first embodiment, when the vehicle 10 contained in a captured image is detected, it is possible to generate a processed image Im4 excluding an unnecessary region by executing crop processing for clipping a necessary region containing the vehicle 10 from the rotated image Im3. As a result, in comparison with a case where the crop processing step is not executed, it is possible to increase the region of the vehicle 10 in the captured image. Thus, it is possible to easily detect the vehicle 10 further remote from the image capture device 9. Therefore, it is possible to improve the accuracy of detecting the vehicle 10 further remote from the image capture device 9.

According to the first embodiment, when a processed image Im4 is input to the first detection model Md1, a target region of the regions that make up the processed image Im4 is masked. Thus, it is possible to generate a first mask image Im5 in which a mask region Ms is added to the target region. At this time, according to the first embodiment, a DNN having the structure of a CNN that implements semantic segmentation or instance segmentation can be used for the algorithm of the first detection model Md1. Thus, it is possible to suppress a decrease in the accuracy of detecting the vehicle 10 due to a variety of off-target regions in a captured image.

According to the first embodiment, it is possible to generate a second mask image Im6 by performing perspective transformation of the first mask image Im5. Thus, it is possible to transform a camera coordinate system to an image coordinate system.

According to the first embodiment, when a first circumscribed rectangle R1 is set for the mask region Ms before the first mask image Im5 is subjected to perspective transformation, it is possible to calculate a base coordinate point P0 that is the vertex of the first circumscribed rectangle R1 with coordinates closest to the measuring point 10*e* of the vehicle 10. Then, it is possible to calculate a first coordinate point P1 that is a coordinate point corresponding to a base coordinate point P0 by performing perspective transformation of the first mask image Im5 after the base coordinate point P0 is calculated. Furthermore, when a second circumscribed rectangle R2 is set for the mask region Ms of the second mask image Im6, it is possible to calculate a second coordinate point P2 that is the vertex of the second circumscribed rectangle R2 with coordinates closest to the measuring point 10*e* of the vehicle 10. Then, it is possible to calculate an image coordinate point P3 by correcting the first coordinate point P1 using the second coordinate point P2. In this way, it is possible to further accurately calculate the image coordinate point P3 by comparing and correcting coordinate points before and after perspective transformation. Thus, it is possible to further improve the accuracy of calculating the position of the vehicle 10.

According to the first embodiment, it is possible to acquire step information on one of the manufacturing steps, being performed on the vehicle 10. Then, when the state information associated with the one of the manufacturing steps, identified by the acquired step information, is identified by using the step database Db1 to acquire the state information on the vehicle 10, it is possible to identify the state of the vehicle 10 contained in the captured image.

According to the first embodiment, it is possible to acquire an image capture parameter on the image capture device 9 that has acquired a raw image Im1. Then, when the calculated image coordinate point P3 and the values of the acquired image capture parameter are substituted into the relational expressions including the vehicle coordinate point Pv as a response variable and including the image coordinate point P3, the image capture parameter, and the vehicle parameter as explanatory variables, it is possible to transform the image coordinate point P3 to the vehicle coordinate point Pv. Thus, it is possible to transform the image coordinate system to the global coordinate system and calculate the position of the measuring point 10*e* of the vehicle 10 in the global coordinate system as the vehicle coordinate point Pv.

According to the first embodiment, the image capture parameter is a height H of the image capture device 9 from the road surface 20, calculated based on the position of the image capture device 9 in the global coordinate system. The vehicle parameter is a height h of the measuring point 10*e* of the vehicle 10 from the road surface 20. As a result, it is possible to calculate an observation error ΔD in accordance with a similarity relationship between the image capture parameter and the vehicle parameter. Then, it is possible to transform the image coordinate point P3 to the vehicle coordinate point Pv by using the calculated observation error ΔD.

According to the first embodiment, it is possible to calculate the position of the vehicle 10 without any installation, such as a marker and a transceiver, used to calculate the position of the vehicle 10, on the vehicle 10. It is possible to calculate the position of the vehicle 10 without mounting the position calculation apparatus 6 on the vehicle 10. Thus, it is possible to increase the versatility of the position calculation system 1.

B. Second Embodiment

Figure 14:
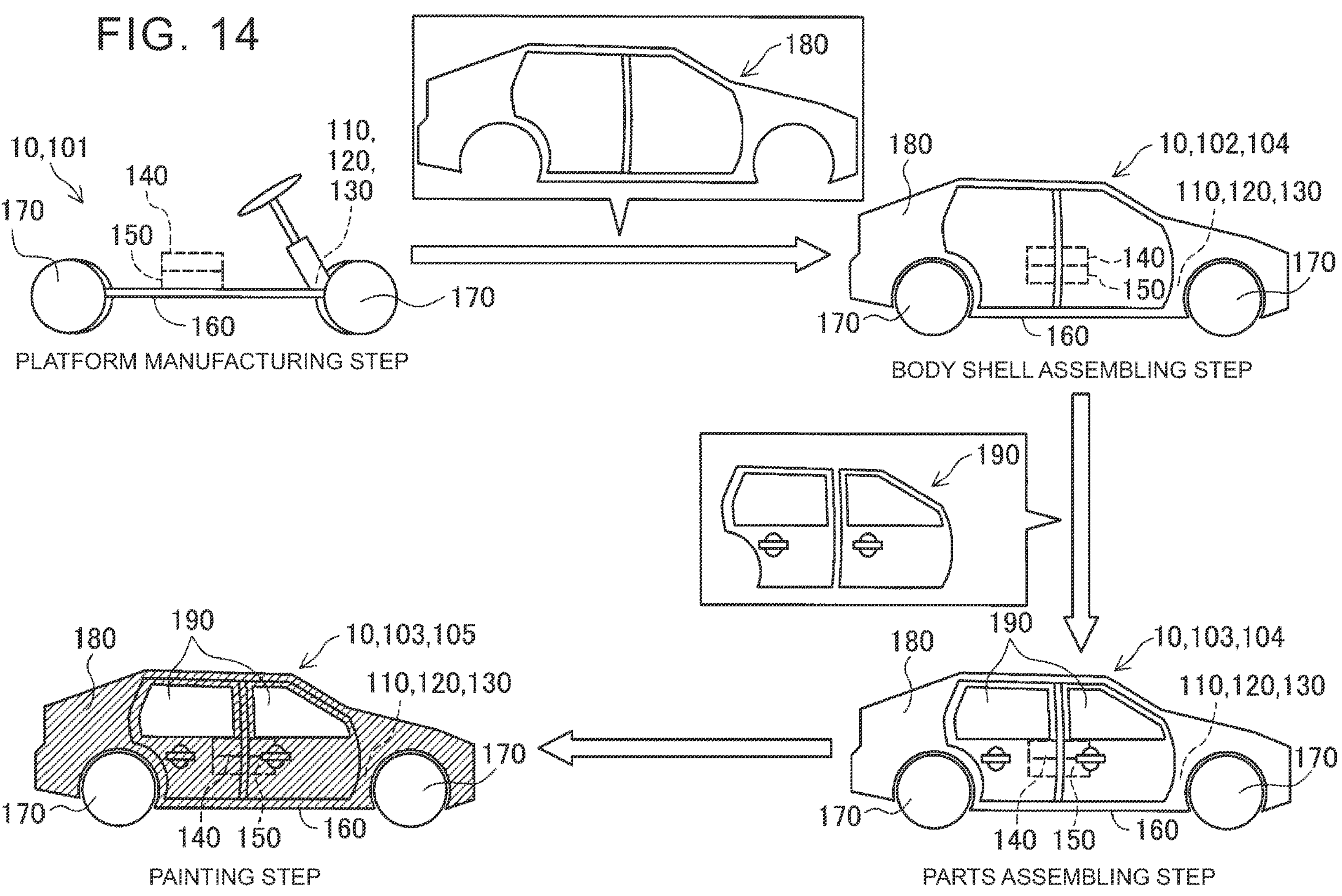
FIG. 14 is a diagram that shows a manufacturing process of a vehicle according to a second embodiment.
Figure 15:
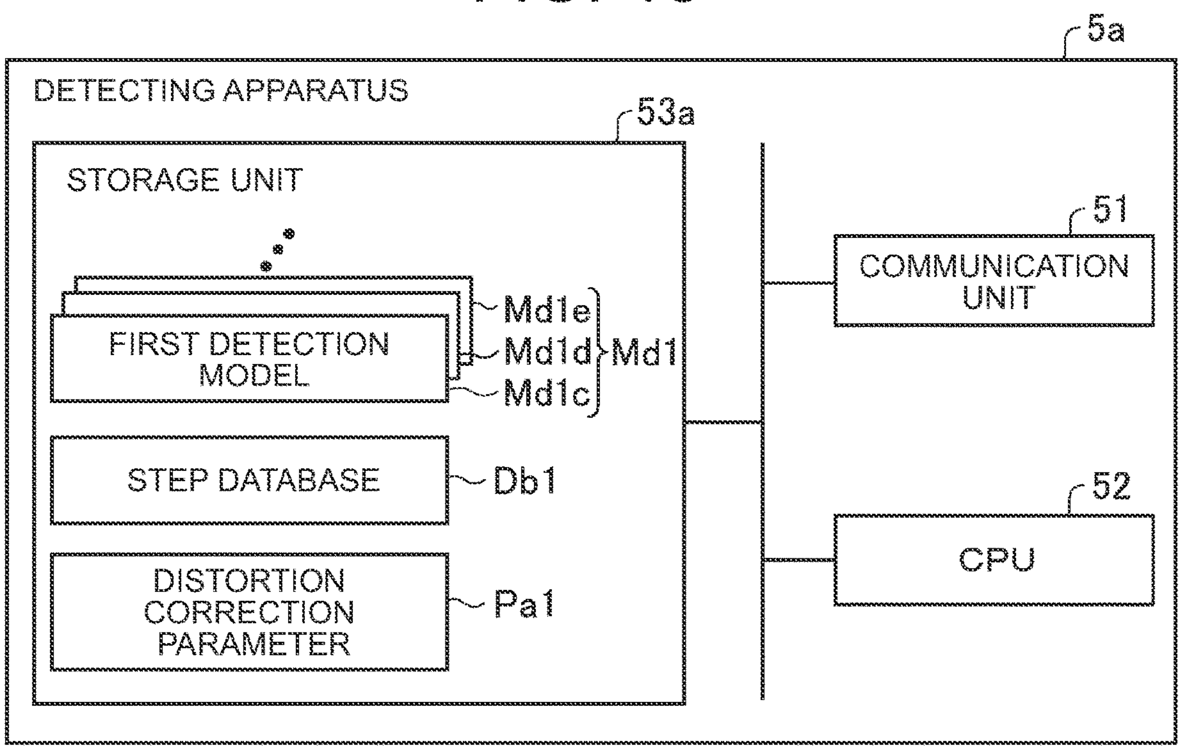
FIG. 15 is a block diagram that shows the configuration of a detecting apparatus according to the second embodiment.

FIG. 14 is a diagram that shows a manufacturing process of the vehicle 10 according to a second embodiment. In FIG. 14, some of the plurality of manufacturing steps that are performed in the manufacturing process of the vehicle 10 are representatively shown. FIG. 15 is a block diagram that shows the configuration of a detecting apparatus 5*a* according to the second embodiment. The present embodiment differs from the first embodiment in part of the manufacturing process of the vehicle 10. Thus, part of the configuration of the detecting apparatus 5*a* is different from that of the first embodiment. The remaining configuration is similar to that of the first embodiment. Like reference signs are assigned to the same components as those of the first embodiment, and the description thereof is omitted.

As shown in FIG. 14, in the present embodiment, the vehicle 10 serving as a finished product is manufactured by assembling the body shell 180 to the platform vehicle 101, then assembling interior parts and exterior parts 190, and painting a vehicle body (body part) made up of the body shell 180, the exterior parts 190, and the like. In other words, in the present embodiment, the vehicle 10 serving as a finished product is manufactured by performing a platform manufacturing step, a body shell assembling step, a parts assembling step, and a painting step in this order. The painting step is a step of painting the vehicle 10. A vehicle 104 before being painted in the painting step (hereinafter, unpainted vehicle 104) and a vehicle 105 after being painted in the painting step (hereinafter, painted vehicle 105) differ from each other in appearance color, so the appearance of the vehicle 10 is different. Thus, in the present embodiment, a storage unit 53*a* of the detecting apparatus 5*a* stores three first detection models Md1*c*, Md1*d*, Md1*e* as detection models appropriate for detection of the vehicle 10 that is classified to one of the states, determined by the appearance shape and appearance color of the vehicle 10. In the following description, the state of the vehicle 10 before being painted in the painting step, like the unpainted vehicle 104, is referred to as "unpainted state". The state of the vehicle 10 after being painted in the painting step, like the painted vehicle 105, is referred to as "painted state".

The first detection model Md1*e* is a first detection model Md1 caused to learn the vehicle 10 that is classified to the "platform state" by a larger number than the vehicle 10 that is classified to a state other than the "platform state". In the first detection model Md1*c*, a first training image is an image containing the vehicle 10 that is classified to the "platform state". A second training image is, for example, an image containing the vehicle 10 that is classified to the "assembled state" and the "unpainted state". The first detection model Md1*c* is used to detect the vehicle 10 that is classified to the "platform state".

The first detection model Md1*d* is a first detection model Md1 caused to learn the vehicle 10 that is classified to the "assembled state" and the "unpainted state" by a larger number than the vehicle 10 that is classified to a state other than the "assembled state" and the "unpainted state". In the first detection model Md1*d*, a first training image is an image containing the vehicle 10 that is classified to the "assembled state" and the "unpainted state". A second training image is, for example, an image containing the vehicle 10 that is classified to the "assembled state" and the "painted state". The first detection model Md1*d* is used to detect the vehicle 10 in the "assembled state" and the "unpainted state".

The first detection model Md1*e* is a first detection model Md1 caused to learn the vehicle 10 that is classified to the "assembled state" and the "painted state" by a larger number than the vehicle 10 that is classified to a state other than the "assembled state" and the "painted state". In the first detection model Md1*e*, a first training image is an image containing the vehicle 10 that is classified to the "assembled state" and the "painted state". A second training image is, for example, an image containing the vehicle 10 that is classified to the "assembled state" and the "unpainted state". The first detection model Md1*e* is used to detect the vehicle 10 that is classified to the "assembled state" and the "painted state".

According to the second embodiment, the unpainted vehicle 104 and the painted vehicle 105 significantly differ in appearance from each other. Thus, before and after being painted in the painting step, it is possible to classify the state of the vehicle 10 into the unpainted state and the painted state. Thus, it is possible to suppress a decrease in the accuracy of detecting the vehicle 10 contained in the captured image in accordance with a difference in appearance color of the vehicle 10 before and after the painting step is performed.

C. Third Embodiment

Figure 16:
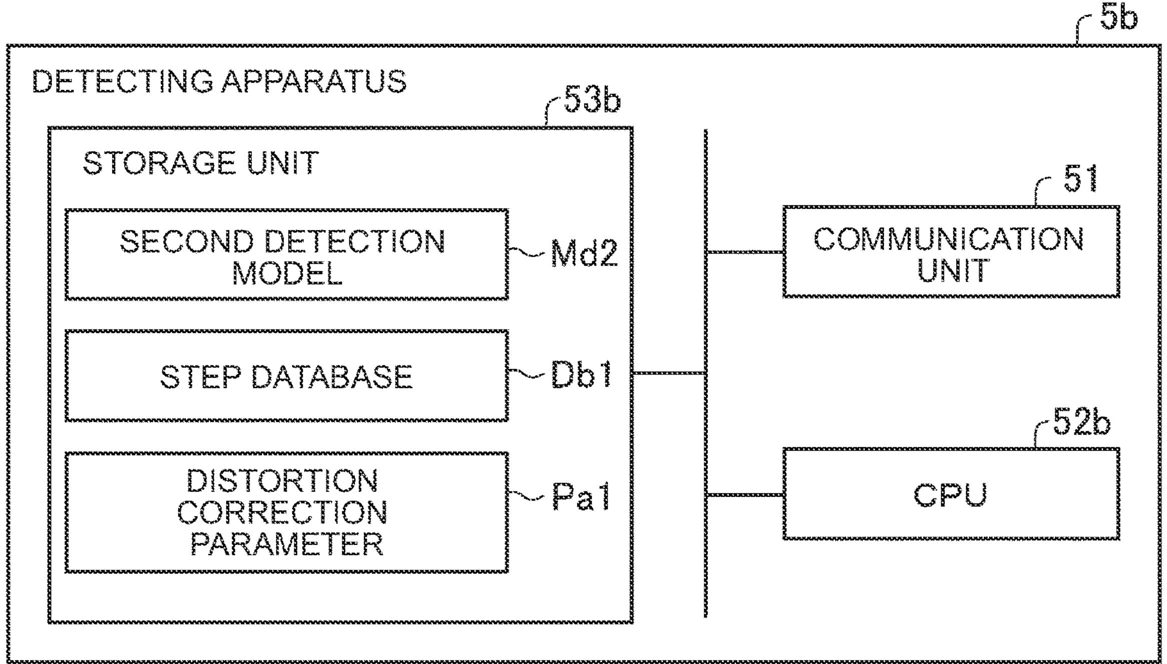
FIG. 16 is a block diagram that shows the configuration of a detecting apparatus according to a third embodiment.

FIG. 16 is a block diagram that shows the configuration of a detecting apparatus 5*b* according to a third embodiment. The present embodiment differs from the first embodiment in a detection model used to detect the vehicle 10 contained in a captured image. Thus, part of the configuration of the detecting apparatus 5*b* and part of the process of the detecting method for the vehicle 10 are different from those of the first embodiment. The remaining configuration is similar to that of the first embodiment. Like reference signs are assigned to the same steps as the steps in the first embodiment and the same components as those of the first embodiment, and the description thereof is omitted.

In the present embodiment, a storage unit 53*b* of the detecting apparatus 5*b* stores one second detection model Md2 as a detection model. The second detection model Md2, as well as the first detection model Md1, is a trained machine learning model used to detect the vehicle 10 contained in a captured image. The second detection model Md2 is a machine learning model trained by inputting a second training data set. The second training data set has a plurality of training images respectively containing the vehicles 10 classified to different states, a region correct label associated with each of a plurality of regions that make up each training image, and a state correct label associated with each of the plurality of training images. As in the case of the first embodiment, the region correct label is a correct label indicating whether each of the regions in a training image is a target region representing the vehicle 10 or an off-target region representing an object other than the vehicle 10. A state correct label is a correct label indicating one of the states of the vehicle 10 contained in a training image. In the present embodiment, when a captured image is input to the second detection model Md2 together with one of the states, identified by state information acquired by the state acquisition unit 525, the second detection model Md2 executes the following process. In this case, the second detection model Md2 identifies a target region contained in the input captured image. Then, the second detection model Md2 masks the target region to generate a first mask image Im5 in which a mask region Ms is added to the target region. For example, a CNN is used as the algorithm of the second detection model Md2. The configuration of the second detection model Md2 is not limited to the above. The second detection model Md2 may be, for example, a trained machine learning model for which an algorithm other than a neural network is used.

Figure 17:
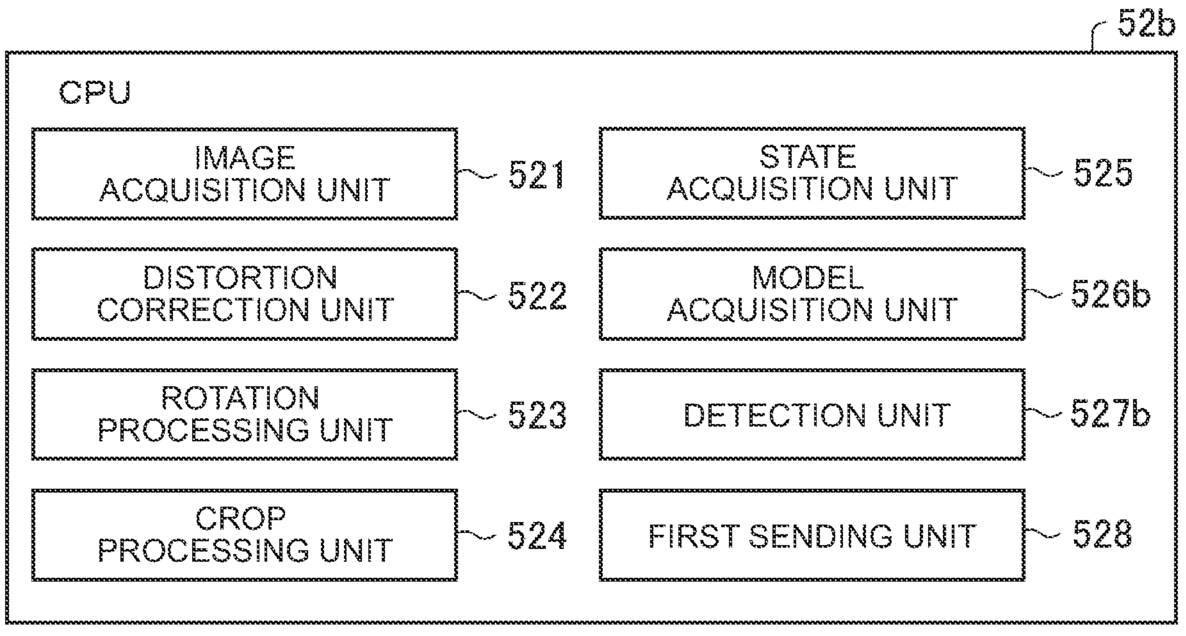
FIG. 17 is a block diagram that shows the details of a CPU mounted on the detecting apparatus according to the third embodiment.

FIG. 17 is a block diagram that shows the details of a CPU 52*b* mounted on the detecting apparatus 5*b* according to the third embodiment. The CPU 52*b* of the detecting apparatus 5*b* according to the present embodiment includes a model acquisition unit 526*b* instead of the model acquisition unit 526 according to the first embodiment. The model acquisition unit 526*b* acquires the second detection model Md2. The CPU 52*b* of the detecting apparatus 5*b* includes a detection unit 527*b* instead of the detection unit 527 according to the first embodiment. The detection unit 527*b* inputs a captured image and one of the states, identified by state information acquired by the state acquisition unit 525, to the second detection model Md2 to identify a target region from among regions that make up the input captured image. Thus, the detection unit 527*b* detects the vehicle 10 contained in the captured image.

Figure 18:
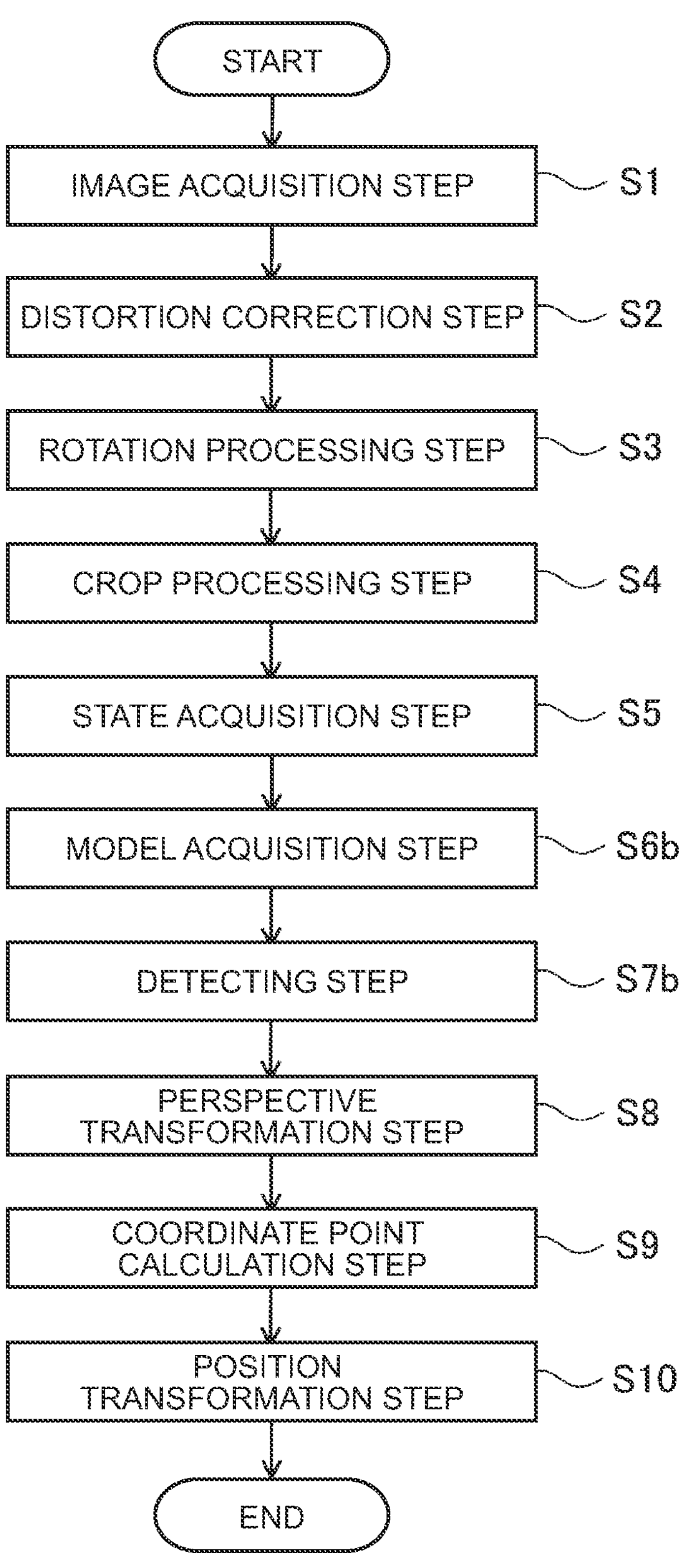
FIG. 18 is a flowchart that shows a detecting method and a position calculation method for a vehicle according to the third embodiment.

FIG. 18 is a flowchart that shows a detecting method and a position calculation method for the vehicle 10 according to the third embodiment. The method shown in FIG. 18 is, for example, repeatedly executed at predetermined time intervals at or after the vehicle 10 that is a target to be detected starts moving in the remote automated driving mode.

In the present embodiment, in the model acquisition step (step S6*b*), the model acquisition unit 526*b* acquires the second detection model Md2. Then, in the detecting step (step S7*b*), the detection unit 527*b* inputs a processed image Im4 and one of the states, identified by the state information acquired by the state acquisition unit 525, to the second detection model Md2. Thus, the detection unit 527*b* detects the outer shape of the vehicle 10 contained in the processed image Im4. Then, the detection unit 527*b* generates a first mask image Im5 in which a mask region Ms is added to a target region by masking the target region in the processed image Im4.

According to the third embodiment, the second detection model Md2 serving as a detection model trained while each of a plurality of training images each containing the vehicle 10 is associated with a state correct label indicating the state of the vehicle 10 contained in the training image is prepared. Thus, when a captured image associated with the state of the vehicle 10 is input to the second detection model Md2, it is possible to accurately detect the vehicle 10 contained in the input captured image. In other words, it is possible to accurately classify regions that make up a captured image input to the second detection model Md2 into a target region and an off-target region. Thus, it is possible to suppress a decrease in the accuracy of detecting the vehicle 10 contained in a captured image in accordance with a difference in appearance among the plurality of manufacturing steps. As a result, it is possible to suppress a decrease in the accuracy of calculating the vehicle coordinate point Pv. Thus, it is possible to reduce a difference between the position of the vehicle 10, calculated by the position calculation apparatus 6, and an actual position of the vehicle 10. Thus, it is possible to create a further appropriate control value.

D. Fourth Embodiment

Figures 19, 20:
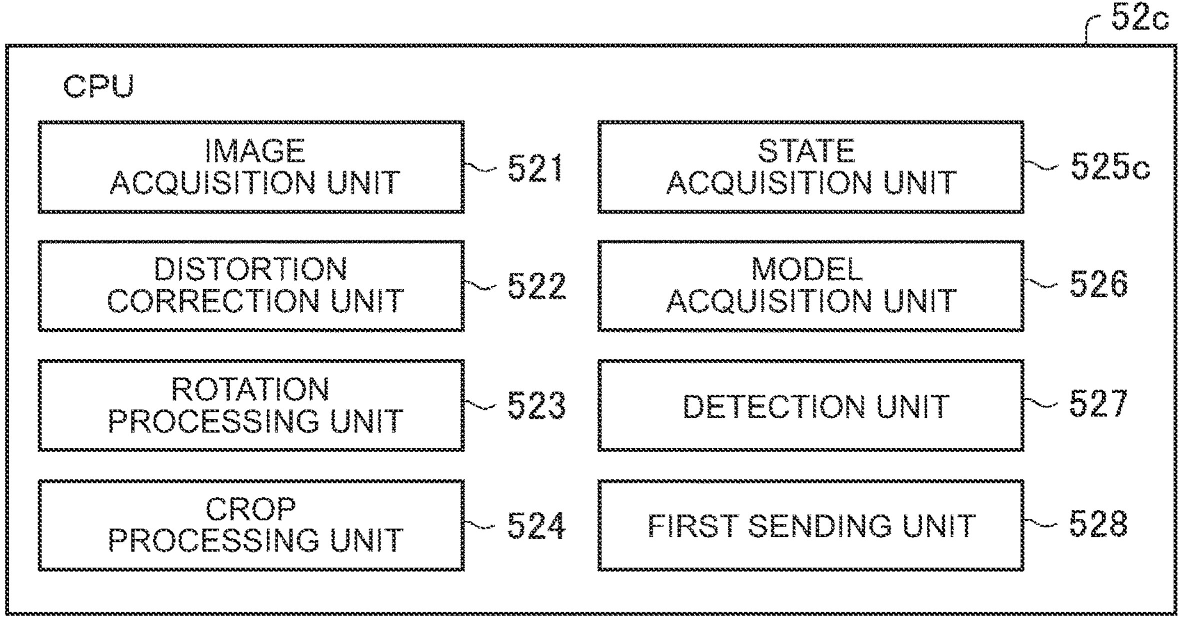
FIG. 19 is a block diagram that shows the configuration of a detecting apparatus according to a fourth embodiment.
FIG. 20 is a block diagram that shows the details of a CPU mounted on the detecting apparatus according to the fourth embodiment.

FIG. 19 is a block diagram that shows the configuration of a detecting apparatus 5*c* according to a fourth embodiment. The present embodiment differs from the first embodiment in a method of acquiring state information. Thus, part of the configuration of the detecting apparatus 5*c* is different from that of the first embodiment. The remaining configuration is similar to that of the first embodiment. Like reference signs are assigned to the same components as those of the first embodiment, and the description thereof is omitted.

In the present embodiment, a storage unit 53*c* of the detecting apparatus 5*c* stores a specific model Md3 instead of the step database Db1. The specific model Md3 is a trained machine learning model used to identify one of the states of the vehicle 10 contained in a captured image and acquire state information indicating the identified one of the states. Specifically, the specific model Md3 is a trained machine learning model caused to, when a captured image is input, output state information on the vehicle 10 contained in a captured image. The specific model Md3 learns features according to the state of the vehicle 10 to identify one of the states of the vehicle 10. For example, a CNN is used as the algorithm of the specific model M3. The configuration of the specific model Md3 is not limited to the above. The specific model Md3 may be, for example, a trained machine learning model for which an algorithm other than a neural network is used.

FIG. 20 is a block diagram that shows the details of a CPU 52*c* mounted on the detecting apparatus 5*c* according to the fourth embodiment. In the present embodiment, a state acquisition unit 525*c* acquires state information on the vehicle 10 contained in a captured image by inputting the captured image to the specific model Md3.

According to the fourth embodiment, the specific model Md3 is trained to output state information on the vehicle 10 contained in a captured image when the captured image is input, and, when a captured image is input to the specific model Md3, it is possible to acquire state information on the vehicle 10 contained in the captured image. In other words, it is possible to acquire state information of the vehicle 10 by using machine learning.

E. Fifth Embodiment

Figures 21, 22:
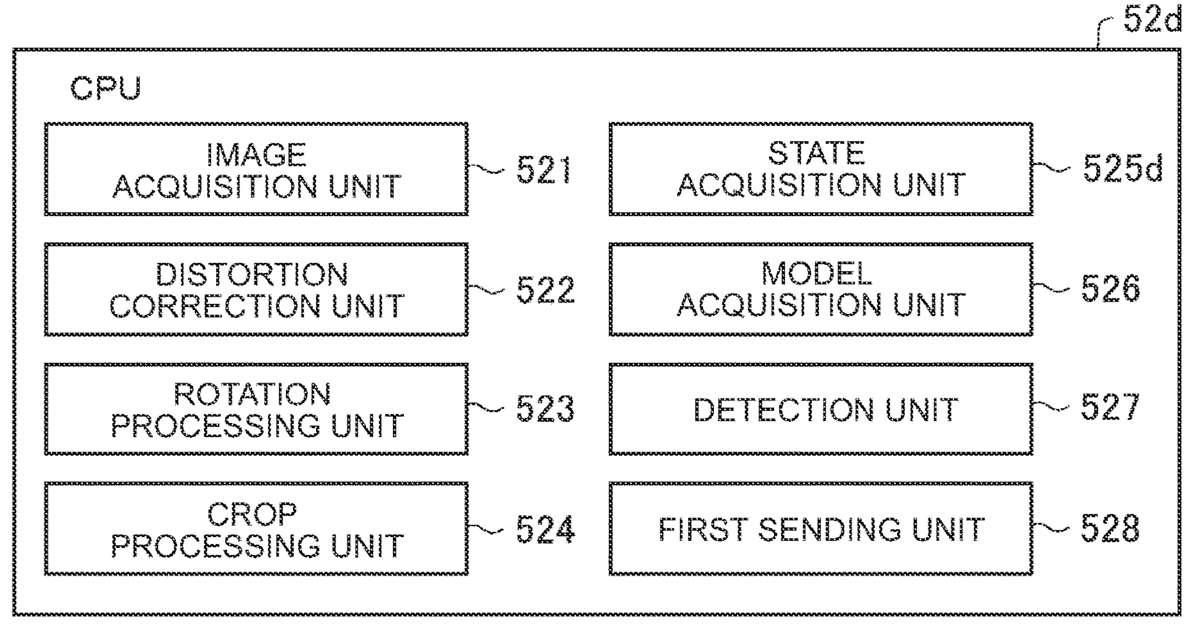
FIG. 21 is a block diagram that shows the configuration of a detecting apparatus according to a fifth embodiment.
FIG. 22 is a block diagram that shows the details of a CPU mounted on the detecting apparatus according to the fifth embodiment.

FIG. 21 is a block diagram that shows the configuration of a detecting apparatus 5*d* according to a fifth embodiment. The present embodiment differs from the first embodiment in a method of acquiring state information. Thus, part of the configuration of the detecting apparatus 5*d* is different from that of the first embodiment. The remaining configuration is similar to that of the first embodiment. The description of the same components as those of the first embodiment is omitted.

In the present embodiment, a storage unit 53*d* of the detecting apparatus 5*d* stores a state database Db3 instead of the step database Db1. The state database Db3 is a database in which image capture information on the image capture device 9 is associated with state information. Image capture information is information for identifying the image capture device 9 that has acquired a raw image Im1. Image capture information is, for example, camera identification information. In this case, the state database Db3 is, for example, a database in which camera identification information, an image capturing range RG of the image capture device 9 identified by the camera identification information, and state information indicating the state of the vehicle 10 according to a manufacturing step that is performed in the image capturing range RG are associated with one another. The configuration of the state database Db3 and image capture information is not limited to the above. Image capture information may include, for example, an image capturing range RG instead of camera identification information.

FIG. 22 is a block diagram that shows the details of a CPU 52*d* mounted on the detecting apparatus 5*d* according to the fifth embodiment. In the present embodiment, a state acquisition unit 525*d* acquires camera identification information indicating the image capture device 9 that has acquired a raw image Im1 as image capture information on the image capture device 9 that has acquired the raw image Im1. Then, the state acquisition unit 525*d* acquires state information on the vehicle 10 contained in the captured image by identifying state information associated with one image capture device 9 identified by the acquired image capture information using the state database Db3.

According to the fifth embodiment, it is possible to acquire image capture information on the image capture device 9. Then, when state information associated with one image capture device 9 identified by the acquired image capture information is identified by using the state database Db3 in which image capture information is associated with state information, it is possible to acquire state information indicating the state of the vehicle 10 contained in the captured image. Thus, it is possible to acquire state information on the vehicle 10 contained in a captured image without performing an image analysis, so it is possible to reduce a processing load of the state acquisition unit 525*d* in the state acquisition step.

F. Alternative Embodiments

F-1. First Alternative Embodiment

The vehicle 10 serving as a finished product may be manufactured by assembling a plurality of units painted. In this case, the vehicle 10 serving as a finished product may be, for example, manufactured by assembling a front unit, a rear unit, a left unit, a right unit, a roof unit, a bottom unit, and the like. The front unit is a half-finished product formed by integrally molding a part group forming the front side of the vehicle 10. The front unit includes, for example, front lamps, a front bumper, a front grille, and a hood. The rear unit is a half-finished product formed by integrally molding a part group forming the rear side of the vehicle 10. The rear unit includes, for example, rear lamps, a rear bumper, and a trunk. The left unit is a half-finished product formed by integrally molding a part group forming the left side of the vehicle 10. The right unit is a half-finished product formed by integrally molding a part group forming the right side of the vehicle 10. Each of the left unit and the right unit includes, for example, a side sill and pillars. The roof unit is a half-finished product formed by integrally molding a part group forming the upper side of the vehicle 10. The roof unit includes, for example, a roof. The bottom unit is a half-finished product formed by integrally molding a part group forming the bottom side of the vehicle 10. The bottom unit includes, for example, the chassis 160 and seats. With such a form as well, it is possible to classify the state of the vehicle 10 into a plurality of states in accordance with the appearance of the vehicle 10. Thus, it is possible to suppress a decrease in the accuracy of detecting the vehicle 10 in accordance with the appearance of the vehicle 10 by inputting a captured image to the first detection model Md1 appropriate for one of the states, determined based on the appearance of the vehicle 10, or inputting a captured image associated with the state of the vehicle 10 to the second detection model Md2.

F-2. Second Alternative Embodiment

In a captured image, as the contrast between the vehicle 10 and the course 2 reduces, a color difference between a target region and an off-target region reduces, so the accuracy of detecting the vehicle 10 may decrease in accordance with the appearance color of the vehicle 10 and the color of the course 2. For this reason, the first detection model Md1 used to detect the vehicle 10 that is classified to the painted state may be prepared in multiple numbers in accordance with the appearance color of the vehicle 10. When, for example, the vehicle 10 that is classified to the painted state is detected, the following two first detection models Md1 may be prepared. In this case, the first detection model Md1 for detecting the vehicle 10 painted with a light-color paint having a lightness higher than or equal to a predetermined threshold and the first detection model Md1 for detecting the vehicle 10 painted with a dark-color paint having a lightness lower than the threshold may be prepared. According to such a configuration, it is possible to classify the state of the vehicle 10 into a plurality of states in accordance with the color of a paint that is used in the painting step. Thus, it is possible to suppress a decrease in the accuracy of detecting the vehicle 10 contained in a captured image in accordance with the color of a paint that is used in the painting step, that is, a difference in appearance color of the vehicle 10.

F-3. Third Alternative Embodiment

Training images included in the first training data set and the second training data set may be images like a raw image Im1, not subjected to processing, such as distortion correction, rotation, and cropping. According to such a configuration, image processing is not required when the first training data set and the second training data set are prepared. Thus, it is possible to reduce a processing load at the time of training the first detection model Md1 and the second detection model Md2.

F-4. Fourth Alternative Embodiment

Training images included in the first training data set and the second training data set each may be any one of a corrected image Im2, a rotated image Im3, and a processed image Im4. According to such a configuration, as in the case of the first embodiment and the third embodiment, when a captured image obtained by processing a raw image Im1 is input to any one of the first detection model Md1 and the second detection model Md2, it is possible to improve the accuracy of detecting the vehicle 10.

F-5. Fifth Alternative Embodiment

In the detecting method for the vehicle 10, shown in FIG. 7 and FIG. 18, the distortion correction step is not an indispensable step. When, for example, steps from the rotation processing step are executed without executing the distortion correction step, the rotation processing unit 523 rotates the raw image Im1 instead of the corrected image Im2 in the rotation processing step. According to such a configuration as well, it is possible to calculate an image coordinate point P3.

F-6. Sixth Alternative Embodiment

In the detecting method for the vehicle 10, shown in FIG. 7 and FIG. 18, the rotation processing step is not an indispensable step. When, for example, the distortion correction step and the rotation processing step are not executed, the crop processing unit 524 executes cropping on the raw image Im1 instead of the rotated image Im3 in the crop processing step. According to such a configuration as well, it is possible to calculate an image coordinate point P3.

F-7. Seventh Alternative Embodiment

In the detecting method for the vehicle 10, shown in FIG. 7 and FIG. 18, the crop processing step is not an indispensable step. When, for example, the distortion correction step, the rotation processing step, and the crop processing step are not executed, the detection unit 527 or the detection unit 527*b* generates a first mask image Im5 in which a mask region Ms is added to the raw image Im1, instead of the processed image Im4 in the detecting step. According to such a configuration as well, it is possible to calculate an image coordinate point P3.

F-8. Eighth Alternative Embodiment

A captured image may contain a plurality of vehicles 10. In this case, the CPU 52 of the detecting apparatus 5, the CPU 52 of the detecting apparatus 5*a*, the CPU 52*b* of the detecting apparatus 5*b*, the CPU 52*c* of the detecting apparatus 5*c*, or the CPU 52*d* of the detecting apparatus 5*d* may include, for example, a deleting unit that deletes a mask region Ms on the vehicle 10, to be excluded from a target for position calculation, from the first mask image Im5. The deleting unit, for example, determines that the mask region Ms present outside a recognition target region as a mask region of the vehicle 10 to be excluded from a target for position calculation in the mask region Ms generated in the detecting step and deletes the mask region Ms present outside the recognition target region from the first mask image Im5. A recognition target region is, for example, a predetermined region in which the vehicle 10 moves in the first mask image Im5. The predetermined region in which the vehicle 10 moves is, for example, a region corresponding to a region with the grid lines 21. The recognition target region is stored in advance in the storage unit 53 of the detecting apparatus 5, the storage unit 53*a* of the detecting apparatus 5*a*, the storage unit 53*b* of the detecting apparatus 5*b*, the storage unit 53*c* of the detecting apparatus 5*c*, or the storage unit 53*d* of the detecting apparatus 5*d*. According to such a configuration as well, when a plurality of vehicles 10 is contained in a captured image, it is possible to exclude the influence of the vehicles 10 that are set outside a target for position calculation. Thus, it is possible to improve the accuracy of calculating the position of the vehicle 10.

F-9. Ninth Alternative Embodiment

A captured image may contain a plurality of vehicles 10. In this case, a DNN that performs instance segmentation may be used as the algorithm of the first detection model Md1 and the algorithm of the second detection model Md2. According to such a configuration, it is possible to classify a plurality of vehicles 10 contained in a captured image and generate a first mask image Im5 with a mask for each of the vehicles 10. Thus, when a plurality of vehicles 10 is contained in a captured image, it is possible to select the vehicle 10 that is a target for position calculation and calculate the position of the selected vehicle 10.

F-10. Tenth Alternative Embodiment

The position calculation system 1 may calculate the position of a stationary vehicle 10. When the position of a stationary vehicle 10 is calculated, the position calculation system 1, for example, calculates the position of the vehicle 10 by using an initial vector direction of the vehicle 10, estimated from a raw image Im1 acquired first after startup of the position calculation system 1, instead of the direction of the moving vector V of the moving vehicle 10. According to such a configuration, when the vehicle 10 is stopped as well, it is possible to calculate the position of the vehicle 10 by using a captured image.

F-11. Eleventh Alternative Embodiment

At least some of the detecting apparatuses 5, 5*a*, 5*b*, 5*c*, 5*d*, the position calculation apparatus 6, and the remote controller 7 may be integrally provided. Furthermore, the units of the detecting apparatuses 5, 5*a*, 5*b*, 5*c*, 5*d*, the position calculation apparatus 6, and the remote controller 7 may be implemented by, for example, cloud computing made up of one or more computers. According to such a configuration, it is possible to change the configuration of the detecting apparatuses 5, 5*a*, 5*b*, 5*c*, 5*d*, the position calculation apparatus 6, and the remote controller 7 as needed.

F-12. Twelfth Alternative Embodiment

The image acquisition unit 521 of each of the detecting apparatuses 5, 5*a*, 5*b*, 5*c*, 5*d* may acquire a raw image Im1 via another external apparatus (for example, the remote controller 7) other than the image capture device 9 without directly acquiring a raw image Im1 from the image capture device 9. According to such a configuration as well, the image acquisition unit 521 of each of the detecting apparatuses 5, 5*a*, 5*b*, 5*c*, 5*d* is capable of acquiring a raw image Im1 acquired by the image capture device 9.

F-13. Thirteenth Alternative Embodiment

The detecting apparatus 5 may detect a vehicle 10 by using a first detection model Md1 stored in another apparatus other than the detecting apparatus 5 and selected by another apparatus other than the detecting apparatus 5. The detecting apparatus 5*a* may detect a vehicle 10 by using a first detection model Md1 stored in another apparatus other than the detecting apparatus 5*a* and selected by another apparatus other than the detecting apparatus 5*a*. The detecting apparatus 5*b* may detect a vehicle 10 by using a first detection model Md1 stored in another apparatus other than the detecting apparatus 5*b* and selected by another apparatus other than the detecting apparatus 5*b*. The detecting apparatus 5*c* may detect a vehicle 10 by using a first detection model Md1 stored in another apparatus other than the detecting apparatus 5*c* and selected by another apparatus other than the detecting apparatus 5*c*. The detecting apparatus 5*d* may detect a vehicle 10 by using a first detection model Md1 stored in another apparatus other than the detecting apparatus 5*d* and selected by another apparatus other than the detecting apparatus 5*d*. According to such a configuration as well, it is possible to acquire a first detection model Md1 according to the state of the vehicle 10.

The disclosure is not limited to the above-described embodiments and may be implemented in various modes without departing from the purport of the disclosure. For example, the technical characteristics in the embodiments, corresponding to the technical characteristics in the aspects described in SUMMARY, may be replaced or combined as needed to solve part or all of the above-described inconvenience or to achieve part or all of the above-described advantageous effects. When the technical characteristics not described as being indispensable in the specification may be deleted as needed.

What is claimed is:

1. A detecting apparatus configured to detect a vehicle contained in a captured image, the vehicle being configured to move in a factory in which a plurality of manufacturing steps is performed to manufacture and ship the vehicle, the vehicle being classified into a plurality of states in accordance with an appearance of the vehicle, the appearance varying among the plurality of manufacturing steps, the detecting apparatus comprising a first processor configured to:

acquire the captured image;

acquire state information indicating one of the states of the vehicle contained in the captured image;

from among a plurality of first detection models that are machine learning models each prepared one by one for the states, acquire the first detection model selected in accordance with the one of the states, identified by the acquired state information; and detect the vehicle contained in the captured image by inputting the captured image to the acquired first detection model and identifying a target region representing the vehicle in the captured image, wherein each of the plurality of first detection models is trained in advance to identify the target region by inputting a plurality of training images, and the plurality of training images includes M (M is an integer greater than or equal to two) first training images each containing the vehicle that is classified to the one of the states and N (N is an integer greater than or equal to zero and less than M) second training images each containing the vehicle that is classified to another one of the states, different from the one of the states.

2. The detecting apparatus according to claim 1, wherein a region correct label is associated with each region in the training image, and the region correct label indicates which one of the target region and an off-target region representing an object other than the vehicle.

3. The detecting apparatus according to claim 1, wherein the first processor is configured to acquire the state information by acquiring step information on one of the manufacturing steps, being performed on the vehicle, and identifying the state information associated with the one of the manufacturing steps, identified by the acquired step information by using a step database in which the state information is associated with each of the plurality of manufacturing steps.

4. The detecting apparatus according to claim 1, wherein the first processor is configured to, when the captured image is input, acquire the state information by inputting the captured image to a specific model that is a machine learning model trained so as to output the state information.

5. The detecting apparatus according to claim 1, wherein the first processor is configured to acquire the state information by acquiring image capture information on image capture devices and identifying the state information associated with one of the image capture devices, identified by the acquired image capture information, by using a state database in which the image capture information is associated with the state information.

6. The detecting apparatus according to claim 1, wherein:

the plurality of manufacturing steps includes painting the vehicle, and the plurality of states includes an unpainted state and a painted state, the unpainted state indicates the state of the vehicle before being painted in painting the vehicle, the painted state indicates the state of the vehicle after being painted in painting the vehicle.

7. The detecting apparatus according to claim 1, wherein the first processor is configured to correct a distortion of the captured image.

8. The detecting apparatus according to claim 1, wherein the first processor is configured to rotate the captured image such that a moving direction of the vehicle is oriented in a predetermined direction.

9. The detecting apparatus according to claim 1, wherein the plurality of states including a platform state, the platform state being a state of a platform in which the vehicle includes at least a wheel, a chassis, a drive unit configured to accelerate the vehicle, a steering device configured to change a traveling direction of the vehicle, a braking device configured to decelerate the vehicle, a vehicle controller configured to control an operation of the vehicle, and a vehicle communication unit configured to communicate with another apparatus other than the host vehicle.

10. A position calculation system configured to calculate a position of a vehicle contained in a captured image, the vehicle being configured to move in a factory in which a plurality of manufacturing steps is performed to manufacture and ship the vehicle, the vehicle being classified into a plurality of states in accordance with an appearance of the vehicle, the appearance varying among the plurality of manufacturing steps, the position calculation system comprising:

a detecting apparatus configured to detect the vehicle contained in the captured image, the detecting apparatus comprising a first processor configured to:

acquire the captured image;

acquire state information indicating one of the states of the vehicle contained in the captured image;

from among a plurality of first detection models that are machine learning models each prepared one by one for the states, acquire the first detection model selected in accordance with the one of the states, identified by the acquired state information; and detect the vehicle contained in the captured image by inputting the captured image to the acquired first detection model and identifying a target region representing the vehicle in the captured image; and generate a first mask image, in which a mask region is added to the target region that is a region representing the vehicle, by masking the target region in the captured image; and a position calculation apparatus configured to calculate a position of the vehicle, the position calculation apparatus including a second processor, the second processor being configured to generate a second mask image by performing perspective transformation of the first mask image, where a designated vertex of a first circumscribed rectangle set for the mask region in the first mask image is a first coordinate point and a vertex indicating the same position as the first coordinate point of a second circumscribed rectangle set for the mask region in the second mask image is a second coordinate point, calculate an image coordinate point indicating a position of the vehicle in an image coordinate system by correcting the first coordinate point using the second coordinate point, and convert the image coordinate point to a vehicle coordinate point indicating a position of the vehicle in a global coordinate system by using a distance from a reference point of the image capture device, calculated based on a position of the image capture device in the global coordinate system, and a distance from the reference point of a predetermined measuring point of the vehicle.

11. A detecting method of detecting a vehicle contained in a captured image, the vehicle being configured to move in a factory in which a plurality of manufacturing steps is performed to manufacture and ship the vehicle, the vehicle being classified into a plurality of states in accordance with an appearance of the vehicle, the appearance varying among the plurality of manufacturing steps, the detecting method comprising:

acquiring the captured image;

acquiring state information indicating one of the states of the vehicle contained in the captured image;

from among a plurality of first detection models that are machine learning models each prepared one by one for the states, acquiring the first detection model selected in accordance with the one of the states, identified by the acquired state information; and detecting the vehicle contained in the captured image by inputting the captured image to the acquired first detection model and identifying a target region representing the vehicle in the captured image, wherein each of the plurality of first detection models is trained in advance to identify the target region by inputting a plurality of training images, and the plurality of training images includes M (M is an integer greater than or equal to two) first training images each containing the vehicle that is classified to the one of the states and N (N is an integer greater than or equal to zero and less than M) second training images each containing the vehicle that is classified to another one of the states, different from the one of the states.

* * * * *